United States Patent
Ferber et al.

(10) Patent No.: US 10,956,922 B2
(45) Date of Patent: Mar. 23, 2021

(54) METHOD AND SYSTEM FOR PERSISTENT ACCOUNT GENERATION AND PROFILING

(71) Applicant: Amobee, Inc., Redwood City, CA (US)

(72) Inventors: Scott Andrew Ferber, Bethesda, MD (US); Kevin Coates Haley, The Hills, TX (US); Aleck Howard Schleider, Reisterstown, MD (US)

(73) Assignee: Amobee, Inc., Redwood City, CA (US)

( * ) Notice: Subject to any disclaimer, the term of this patent is extended or adjusted under 35 U.S.C. 154(b) by 214 days.

(21) Appl. No.: 15/889,808

(22) Filed: Feb. 6, 2018

(65) Prior Publication Data

US 2018/0225686 A1 Aug. 9, 2018

Related U.S. Application Data

(60) Provisional application No. 62/455,884, filed on Feb. 7, 2017.

(51) Int. Cl.
*G06Q 30/02* (2012.01)
*G06F 16/335* (2019.01)
*G06N 5/02* (2006.01)

(52) U.S. Cl.
CPC ....... *G06Q 30/0204* (2013.01); *G06F 16/337* (2019.01); *G06Q 30/0201* (2013.01);
(Continued)

(58) Field of Classification Search
CPC ........... G06Q 30/0204; G06Q 30/0202; G06Q 30/0246; G06Q 30/0251; G06Q 30/0272; G06Q 30/0201; G06Q 30/0242; G06Q 30/0205; G06F 16/0337; G06N 5/02; G06N 20/00
(Continued)

(56) References Cited

U.S. PATENT DOCUMENTS

2015/0348119 A1* 12/2015 Ferber .................... H04L 67/22
705/14.45
2016/0094883 A1* 3/2016 Tidwell ............. H04N 21/4524
725/109
(Continued)

OTHER PUBLICATIONS

Shamah, Oracle Acquires Israeli Big-Data Firm Crosswise for Reported $50m, The Times of Israel, (Apr. 14, 2016), https://www.timesofisrael.com/oracle-acquires-israeli-big-data-firm-crosswise-for-reported-50m (Year: 2016).*

*Primary Examiner* — Charles Guiliano
(74) *Attorney, Agent, or Firm* — Kwan & Olynick LLP

(57) ABSTRACT

The present teaching relates to method, system, and medium for profiling accounts. A plurality of identifiers are obtained, wherein each of the plurality of identifiers is associated with one of a device operated by a user and a platform on which the user consumes content in one or more media types. An account corresponding to the user is created, wherein the account represents the user across devices, platforms, and/or media types. A persistent identifier is generated for the account, wherein the persistent identifier links the plurality of identifiers. Consumption data related to the account with the persistent identifier is obtained. The consumption data is gathered from sources associated with the plurality of identifiers across different devices, platforms, or media types, and the account is profiled based on the obtained consumption data.

18 Claims, 25 Drawing Sheets

(52) U.S. Cl.
CPC ..... *G06Q 30/0202* (2013.01); *G06Q 30/0242* (2013.01); *G06Q 30/0246* (2013.01); *G06Q 30/0251* (2013.01); *G06Q 30/0272* (2013.01); *G06N 5/02* (2013.01); *G06Q 30/0205* (2013.01)

(58) Field of Classification Search
USPC .............................................. 705/7.31, 7.33
See application file for complete search history.

(56) References Cited

U.S. PATENT DOCUMENTS

2016/0379123 A1* 12/2016 Younessian .............. G06N 5/04
706/52
2017/0039242 A1* 2/2017 Milton ............... G06Q 30/0269

* cited by examiner

METHOD AND SYSTEM FOR PERSISTENT ACCOUNT GENERATION AND PROFILING

CROSS-REFERENCE TO RELATED APPLICATIONS

The present application claims priority to U.S. Provisional Application 62/455,884, filed Feb. 7, 2017, and is related to the following applications: U.S. patent application Ser. No. 15/889,614 filed on even date entitled "METHOD AND SYSTEM FOR OPTIMIZED CONTENT ITEM ALLOCATION", U.S. patent application Ser. No. 15/889,739 filed on even date entitled "METHOD AND SYSTEM FOR GENERATING AUDIENCE CLUSTERS", U.S. patent application Ser. No. 15/889,785 filed on even date entitled "METHOD AND SYSTEM FOR FORECASTING PERFORMANCE OF AUDIENCE CLUSTERS", and U.S. patent application Ser. No. 15/889,847 filed on even date entitled "METHOD AND SYSTEM FOR FORECASTING PERFORMANCE OF PERSISTENT USER ACCOUNTS", all of which are incorporated herein by reference in their entirety.

BACKGROUND

1. Technical Field

The present teaching relates to methods, systems, and programming for content allocation. Specifically, the present teaching relates to allocation of content items to audience groups.

2. Technical Background

In recent years, the percentage of the consumer demographics on the Internet has experienced exponential growth, and continues to grow, thereby fueling the incentive for businesses to advertise online. Optimizing content placement e.g., advertisement (ad) placement to satisfy one or more objectives, however, can be a challenge. For instance, advances in the performance of computer hardware have greatly enhanced the capabilities of servers and networks to obtain and process data with lowered costs. However, the amount of data available to be obtained and processed for optimizing ad placement has grown exponentially in comparison with any advances in hardware performance. Typical advertisement allocation systems focus on optimizing individual campaigns separately due to limitations on computational resources, and the time required to obtain overall enhanced results. Thus, typical content allocation systems in many circumstances obtain significantly less desirable results.

Furthermore, with content suppliers focusing on delivering content to targeted audiences, the usage of data sets that characterize users is becoming increasingly important. However, users typically have multiple data sets that are associated with different data providers. Moreover, each user may have a unique ID corresponding to each data set associated with the respective data provider. Thus, content distributors are frequently unable to efficiently determine the appropriate group of users that should be targeted with particular content.

Therefore, there is a requirement to develop solutions to address such problems.

SUMMARY

The teachings disclosed herein relate to methods, systems, and programming for advertising. More particularly, the present teaching relates to methods, systems, and programming related to exploring sources of advertisement and utilization thereof.

In one example, there is provided a method implemented on a computer having at least one processor, a storage, and a communication platform for profiling accounts. In accordance with the method, a plurality of identifiers are obtained, wherein each of the plurality of identifiers is associated with one of a device operated by a user and a platform on which the user consumes content in one or more media types. An account corresponding to the user is created, wherein the account represents the user across devices, platforms, and/or media types. A persistent identifier for the account is generated, the persistent identifier linking the plurality of identifiers, and consumption data related to the account with the persistent identifier is obtained, wherein the consumption data is gathered from sources associated with the plurality of identifiers across different devices, platforms, or media types. The account is profiled based on the obtained consumption data.

In a different example, there is provided a system for profiling accounts. The system comprises an account generator, a consumption data collecting unit, and a profiling unit. The account generator is configured to obtain a plurality of identifiers, wherein each of the plurality of identifiers is associated with one of a device operated by a user and a platform on which the user consumes content in one or more media types, create an account corresponding to the user, wherein the account represents the user across devices, platforms, and/or media types, and generate a persistent identifier for the account, the persistent identifier linking the plurality of identifiers. The consumption data collecting unit is configured to obtain consumption data related to the account with the persistent identifier, the consumption data being gathered from sources associated with the plurality of identifiers across different devices, platforms, or media types. The profiling unit is configured to profile the account based on the obtained consumption data.

Other concepts relate to software for implementing the present teaching of an optimal content item allocation system. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided a non-transitory machine-readable medium having information recorded thereon, wherein the information, when read by the machine, causes the machine to perform the following steps of obtaining a plurality of identifiers, wherein each of the plurality of identifiers is associated with one of a device operated by a user and a platform on which the user consumes content in one or more media types; creating an account corresponding to the user, wherein the account represents the user across devices, platforms, and/or media types; generating a persistent identifier for the account, the persistent identifier linking the plurality of identifiers; obtaining consumption data related to the account with the persistent identifier, the consumption data being gathered from sources associated with the plurality of identifiers across different devices, platforms, or media types; and profiling the account based on the obtained consumption data.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
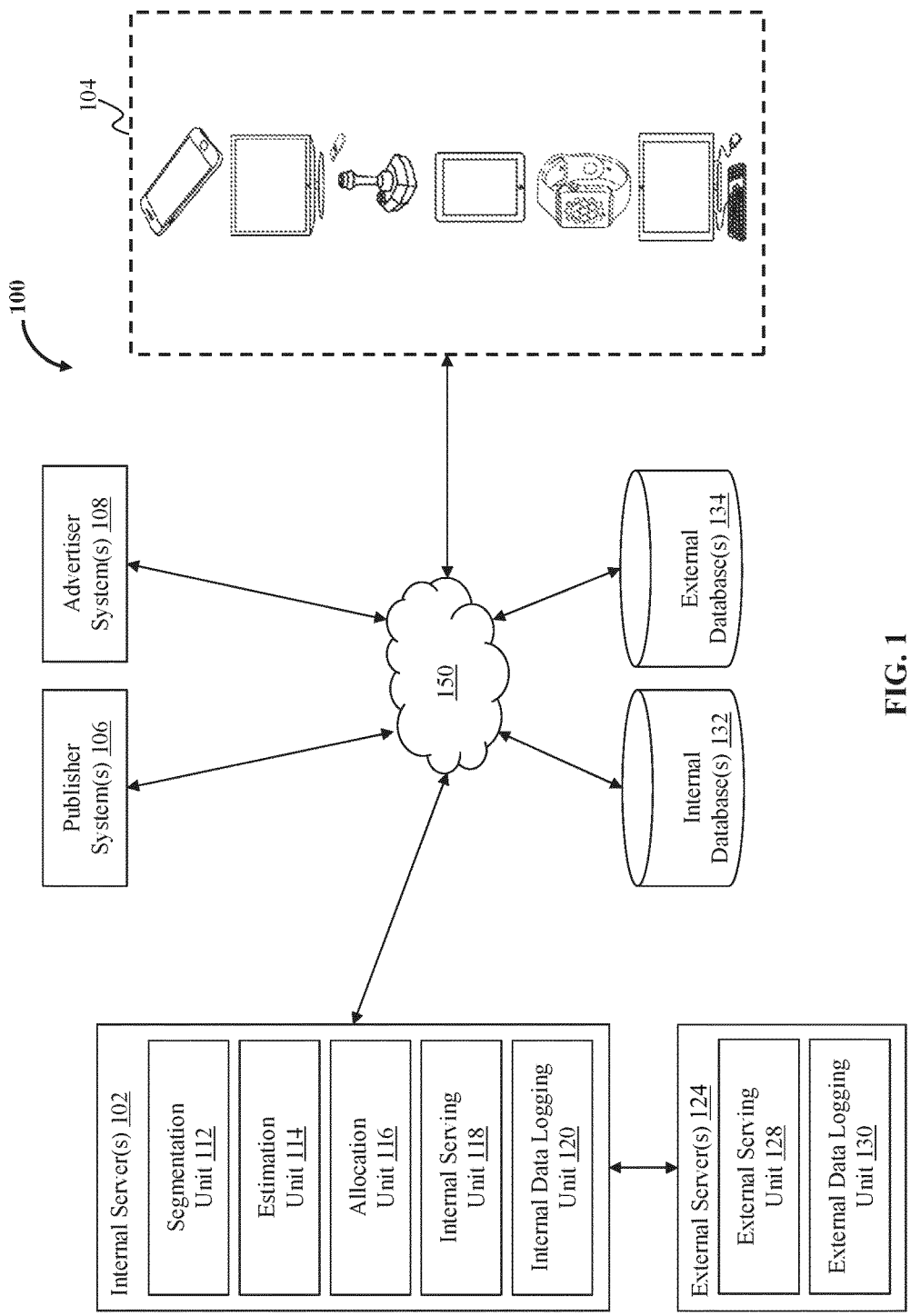
FIG. 1 depicts an exemplary diagram illustrating a networked environment for facilitating content distribution, in accordance with various embodiments of the present teaching.

FIG. 1 depicts an exemplary diagram illustrating a networked environment for facilitating content distribution, in accordance with various embodiments of the present teaching. By content distribution, the content being distributed can be general content or advertisements or any other type of content, whether online or offline. In addition, the content being distributed in accordance with the present teaching may be of any of media types, including text, audio, video, image, multi-media content, television, or any combination thereof. The distribution within the meaning of the present teaching encompasses distribution of content across different information channels, across different platforms, and across different media types. Although some of the embodiments as will be discussed herein may be described in the context of particular type of content (e.g., advertisements) or with respect to specific type of media or platform, such disclosure is not and should not be construed as a limitation to the scope of the present teaching.

As shown in FIG. 1, system 100 depicts an exemplary networked environment for serving advertisements with respect to an advertisement-placement opportunity. As shown, the exemplary system 100 includes internal server(s) 102, external servers 124, user devices 104, publisher system(s) 106, advertiser system(s) 108, one or more databases (e.g., internal database(s) 132, external database(s) 134, etc.), network 150, or other components. Network 150 can be a single network or a combination of different networks. For example, a network can be a local area network (LAN), a wide area network (WAN), a public network, a private network, a proprietary network, a Public Switched Telephone Network (PSTN), the Internet, a wireless network, a virtual network, or any combination thereof. A network may also include various network access points (not shown), e.g., wired or wireless access points such as base stations or Internet exchange points, through which a data source may connect to the network in order to transmit information via the network.

By one embodiment, the internal server 102 includes a segmentation unit 112, an estimation unit 114, an allocation unit 116, an internal serving unit 118, and an internal data logging unit 120. The external server 124 includes an external serving unit 128, and an external data logging unit 130. User devices 104 may include one or more desktops, laptops, tablets, smartphones, televisions, game systems, or other Internet enabled user devices. The internal server 102 as well as the external server 124 may be configured to provide advertisements (or other content) for presentation to the users (e.g., on their user devices) via the network 150. The advertisements may be provided in the form of media objects (e.g., videos, animations, images, etc.) for presentation to the users.

By one aspect of the present teaching, the segmentation unit 112 is configured to partition users (also referred to herein as audiences) to generate ordered audience groups (or audience clusters) for each advertisement exposure opportunity (i.e., a placement opportunity). The estimation unit 114 is configured to provide prediction or forecast information of attributes associated with the audience clusters to the segmentation unit 112. The allocation unit 116 is configured to match supply and demand to generate allocation information e.g., which advertisement(s) from the advertiser systems 108 are to be allocated to audience group(s) of which advertisement opportunity that is presented by the publisher system 106. By one embodiment, the allocation unit 116 allocates advertisements based on the audience clusters, the prediction information of the attributes associated with the audience clusters, demand information (e.g., advertisements from the advertiser system 108), supply information (e.g., advertisement opportunities presented by the publisher 106), or other information. The allocation unit 116 utilizes information provided by the segmentation unit 112, and the estimation unit 114 to perform the allocation of advertisement(s) or advertisement campaigns. Such allocations may be across different devices such as traditional television, IPTV, personal computers, mobile devices, and other content viewing devices. The allocation is carried out based on optimization. Details regarding the segmentation unit 112, the estimation unit 114, and the allocation unit 116 are described in detail below.

By one embodiment, the internal server 102 may be configured to provide digital content to users. In such embodiments, the internal serving unit 118 provides i.e., serves the digital content that is to be displayed on the device(s) operated by the users, and the internal data logging unit 120 maintains a log (i.e., a record) of the served content in the internal database 132. In some embodiments, the internal server 102 may utilize the external server 124 for serving content to the users. For example, in the case of serving television (TV) content, the internal server 102 may generate and transmit instruction(s) to the external server 124, indicating which TV content is to be delivered to which group(s) of users. In such a case, the external serving unit 128 may be configured to deliver the TV content to the designated users, in accordance with the instructions from the internal server 102. Moreover, the external data logging unit 130 may maintain a record of the served TV content in the external database 134.

Figure 2:
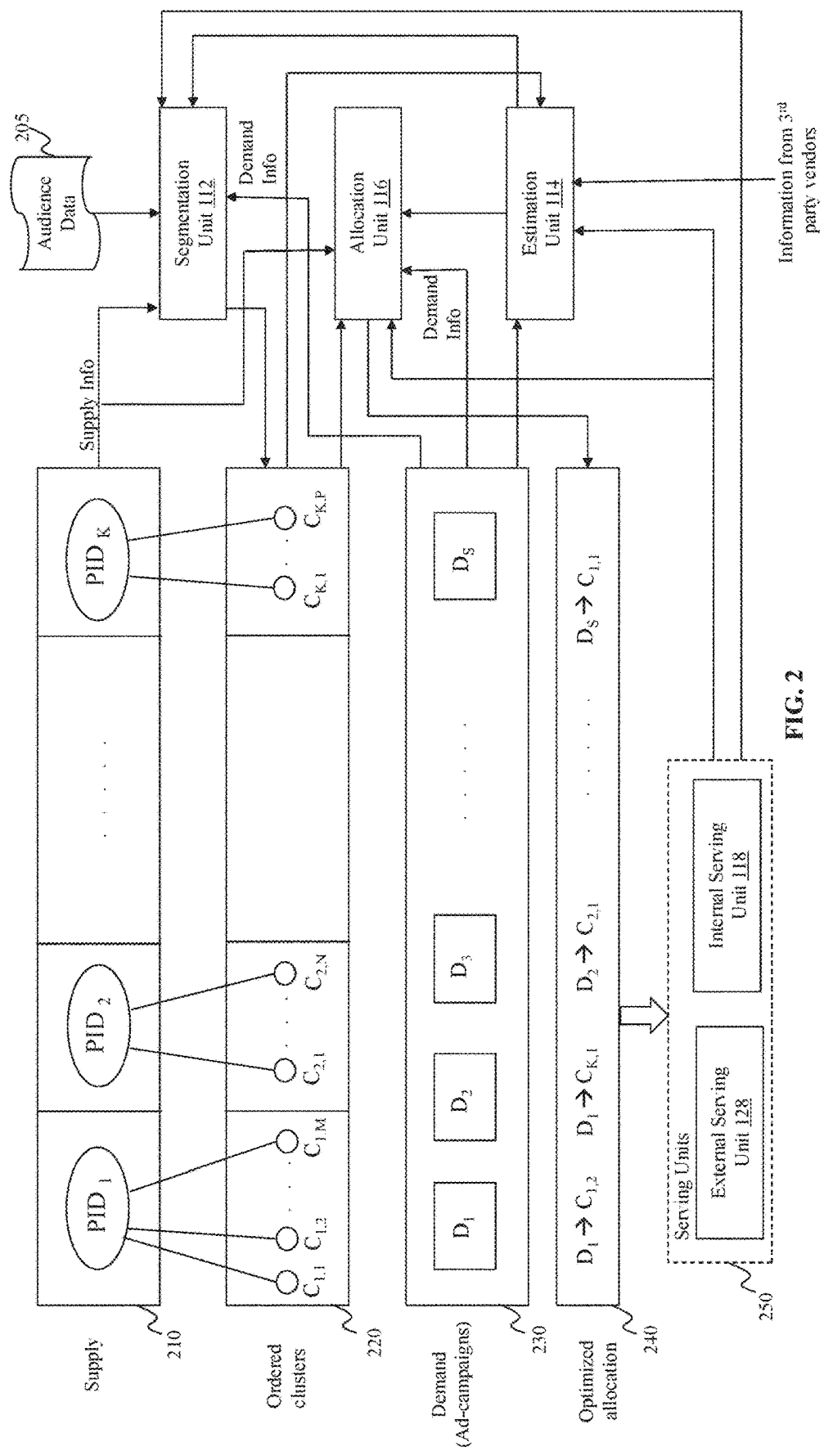
FIG. 2 depicts an exemplary scheme for optimized content distribution, in accordance with various embodiments of the present teaching.

FIG. 2 depicts an exemplary scheme for optimized content distribution, in accordance with various embodiments of the present teaching. Specifically, FIG. 2 depicts an exemplary scheme by which the supply-demand in content distribution is optimized.

As shown in FIG. 2, supply information 210 corresponding to potential advertisement exposure opportunities associated with different publisher systems 106 (of FIG. 1), may be transmitted to the segmentation unit 112, and such information is to be used to determine users who are considered most suitable to receive content or advertisements to be delivered to the underlying publisher. Each advertisement exposure opportunity may be identified by an identification, e.g., a placement identifier or PID and may include metadata characterizing the underlying publisher, e.g., applicable platform, media type, distribution time, or constraints associated with this supplier. Further, the segmentation unit may receive audience data 205, which may include information pertaining to audiences (i.e., users) that the publishers may reach. The segmentation unit 112 may further receive demand information 230, e.g., from the advertiser system 108 (of FIG. 1). The demand information may correspond to a plurality of advertisements associated with different campaigns that are to be distributed to appropriate audiences, determined by the system 100 via the respective advertisement exposure opportunities present in the publisher system 106. The demand information e.g., the advertisement campaign may also include metadata specifying, e.g., the nature of the advertisements, the constraints related to the target audience, demographics of such audience, and constraints related to the distribution such as prime time with limited slots of 1.5 minutes, etc.

The segmentation unit 112 is configured to generate audience clusters associated with each advertisement exposure opportunity. By one embodiment, each audience cluster includes various users and optionally meta information thereof wherein the users in the cluster meet some given criteria, e.g., "soccer mom," "young professionals," "middle aged professionals," or "teenagers." As such, users in a cluster share some common traits or characteristics.

The segmentation unit 112 may also receive demand information indicating certain attribute(s) that an advertiser desires to achieve. For instance, the segmentation unit 112 may receive information indicating that a particular advertiser is more interested in targeting audiences that have a high viewability attribute or audiences that have high click-through-rate (CTR) attribute. Further, the segmentation unit 112 may receive forecast information from the estimation unit 114 that enables the segmentation unit 112 to generate audience clusters in a manner that is consistent with the forecasts characterized or predicted by the estimation unit 114.

To obtain forecast information, the estimation unit 114 may receive information pertaining to the demand 230 and optionally information from one or more third party vendors, which may provide a variety range of information such as previous content access of different information sources and events associated therewith with respect to different audience groups. Based on such received information, the estimation unit 114 forecasts information pertaining to the performance of the audience cluster(s) with respect to different attributes (e.g., CTR, viewability, etc.) in accordance with certain predictions models (described later with reference to FIG. 7A). Such forecast information from the estimation unit 114 may facilitate the segmentation unit 112 to generate ordered audience clusters (i.e. ranked audience clusters) 220 for each advertisement exposure opportunity so that the forecast attributes can be met when advertisements are distributed to one or more clusters in the ordered audience clusters. It should be appreciated that the generated ordered audience clusters 220 may be optimized with respect to certain requirements, which may be estimated either by the estimation units in the form of forecasts or from known demands (i.e., previous ad-campaigns), and thus allowing the allocation unit 116 to allocate, when future demand arrives, advertisements to most promising audience groups in an optimal manner 240.

As the ordered audience clusters for each placement opportunity are pre-segmented in an optimal way, in operation, when an actual demand arrives, it is possible for allocation unit to select, from the pre-segmented audience clusters, most appropriate audience cluster(s) to distribute the advertisement associated with the demand. The order of the audience clusters may also facilitate more efficient operation. For example, the audience clusters associated with a placement opportunity may be ordered according to some desired performance attribute, e.g., CTR, so that if the actual demand also requires to optimize CTR, the search for the most promising audience clusters may be conducted in the order. In some embodiments, for each placement opportunity, there may be multiple ordered audience clusters with each associated attribute (e.g., one is for optimal CTR and the other for optimal viewability) to facilitate an efficient search of optimal cluster(s) under different demand attributes.

As shown in FIG. 2, ordered audience clusters of $C_{1,1}$, $C_{1,2}, \ldots C_{1,M}$ is formed for the first advertisement exposure opportunity (represented by placement identifier $PID_1$). As discussed above, there may be multiple ordered audience clusters associated with the same PID (not shown). Similarly, ordered audience clusters of $C_{2,1}$, $C_{2,2}, \ldots C_{2,N}$ is generated for $PID_2$, and ordered audience clusters of $C_{K,1}$, $C_{K,2}, \ldots C_{K,P}$ is generated for $PID_K$. It should be appreciated that a number of audience clusters (i.e., value of parameters M, N, and P, respectively) that are included in the ordered audience clusters may be determined based on criteria associated with the respective advertisement exposure opportunity.

With the ordered audience clusters for different PIDs created prior to allocation, when an actual demand is received, the allocation unit 116 may determine an optimal matching between the actual demand and supply (PIDs and the ordered audience clusters). In operation, the allocation unit 116 allocates a demand to a supply and distributes the content to specific one or more audience clusters associated with the supply. This is a matching process by which advertisements (demand) are to be distributed to some selected audience cluster(s) from the ordered audience clusters of the advertisement exposure opportunity (supply), in accordance with an optimization model.

For instance, as shown in FIG. 2, a portion of the demand ($D_1$) is allocated to the cluster $C_{1,2}$ (belonging to the $PID_1$), and a portion of the advertisement campaign $D_1$ is allocated to the cluster $C_{K,1}$ (belonging to $PID_K$). The computed allocations of the advertisement campaigns (or portions of the advertisement campaigns) are forwarded to the serving unit 250, which includes the external serving unit 128, and the internal serving unit 118. The serving unit 250 executes the designated allocations, and thereafter provides a feedback regarding the serving of the advertisement allocations to the segmentation unit 112, the estimation unit 114, and the allocation unit 116, which utilize such feedback information to update/modify their respective functions. A detailed description of the functions performed by the segmentation unit 112, the estimation unit 114, and the allocation unit 116, is provided below.

Figure 3A:
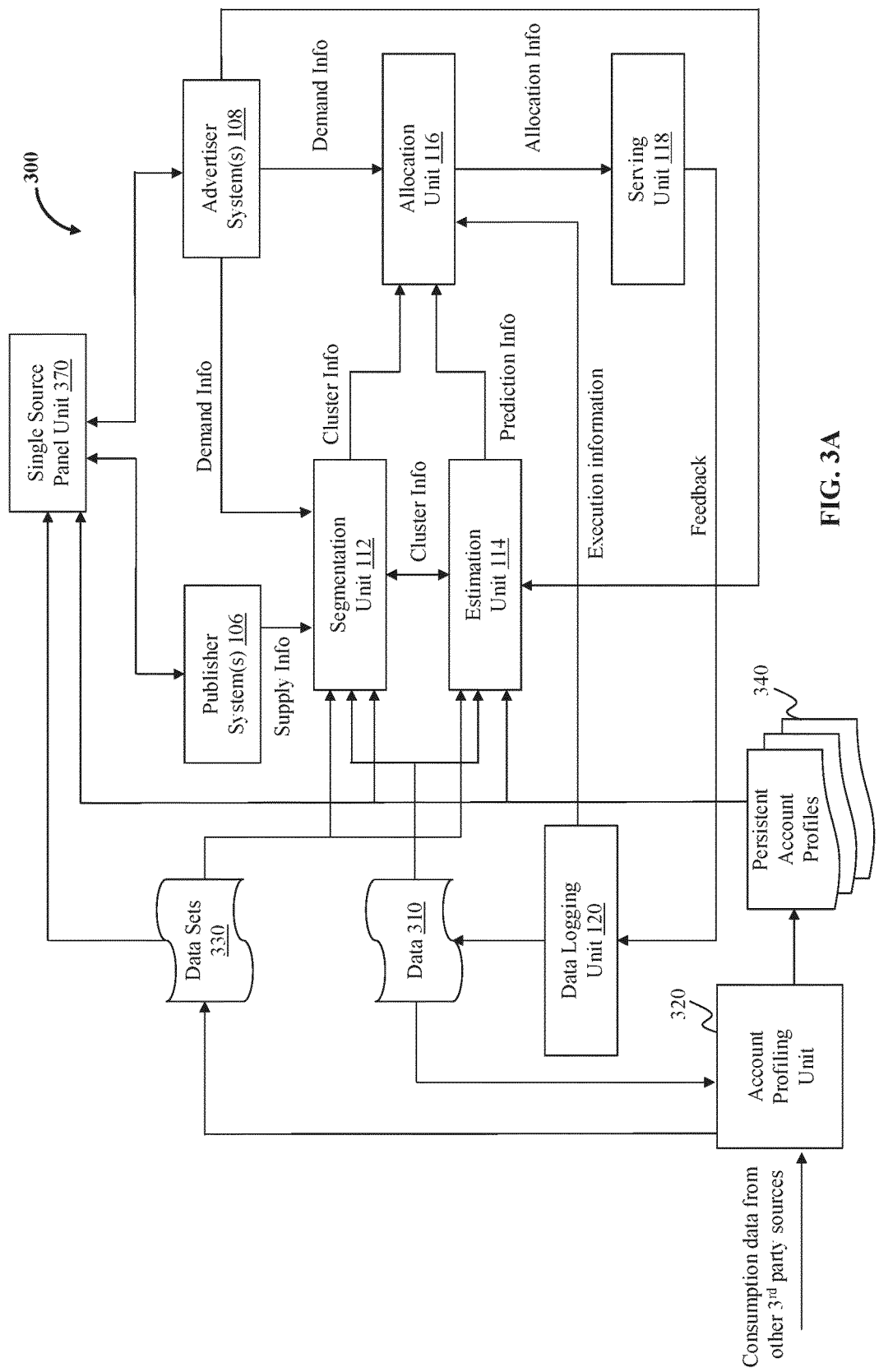
FIG. 3A depicts an exemplary high level system diagram of a part of an internal server related to optimized content allocation, in accordance with various embodiments of the present teaching.

FIG. 3A depicts an exemplary high level system diagram of a part of an internal server related to optimized content allocation, in accordance with various embodiments of the present teaching. The relevant portion of the internal server depicted here as an advertisement distribution system 300 includes the publisher system(s) 106, the advertiser system(s) 108, the segmentation unit 112, the estimation unit 114, the allocation unit 116, the serving unit 118, the data logging unit 120. The system 300 further includes input data 310, an account profiling unit 320, data sets 330, persistent account profiles 340, and a single source panel unit 370. As described below, the advertisement distribution system 300 depicted herein segments audience clusters, forms ordered audience clusters for different placement opportunities, and allocates advertisements to opportunities with designated audience clusters in an optimal manner. As will be made clear below, the system 300 performs its functions across different operating platforms, different media types, and different channels within the same media types.

According to one embodiment, the publisher system 106 provides supply information to the segmentation unit 112. The supply information corresponds to advertisement exposure opportunities. As stated previously, each advertisement exposure opportunity may be identified by an identification, i.e., the placement identifier or PID, and may include metadata characterizing the underlying publisher, e.g., applicable platform, media type, distribution time, or constraints associated with this supplier. The metadata may also include information identifying supply-side approved charges for placing content (e.g., charge per exposure opportunity, charge per set of exposure opportunities, etc., approved by publishers), information identifying hard or soft supply-side constraints, information identifying penalties for failing to satisfy soft supply-side constraints or other constraints, type of media (owned, earned, paid, or other media type), format of media (banner, search, video, digital or other media format) or other information. The constraints related to a specific advertisement exposure opportunity may also include timing constraints, viewability constraints and the like. The timing constraints may be a timeframe such as prime time or even dictate for instance, a fixed starting time and time-duration associated with the advertisement exposure opportunity, whereas viewability constraint may correspond to achieving a threshold number of views of the advertisement(s) by the users.

The segmentation unit 112 may also be influenced by demand, which may be via the estimation unit in the form of forecasts estimated based on past demands or via the previous demand information from the advertisement servers. For example, the segmentation unit 112 may receive prior demand information from advertiser system 108. By one embodiment, the prior demand information may correspond to a plurality of advertisement campaigns that the advertiser system(s) 108 served in respective advertisement exposure opportunities presented by the publisher system 106. Each advertisement campaign may include metadata including information identifying hard or soft demand-side constraints, information identifying penalties for failing to satisfy soft demand-side constraints or other constraints, information identifying advertisements or other content items to be served, information identifying the attributes or other targeting description of the advertisements or other content items, or other information.

The demand side constraints may further include information identifying one or more key performance indicators (KPIs) or other objectives for one or more campaigns (e.g., KPIs or other objectives related to volume, demographics, viewability, click-through rate, etc., for individual campaigns or as a whole for a set of campaigns), information identifying demand-side approved costs for placing content (e.g., costs per exposure opportunity, overall campaign costs, etc., approved by advertisers), information identifying timing constraints associated with each advertisement of the campaign, and/or information identifying location-distribution constraints e.g., an advertiser such as Disney may not want to place their advertisement(s) on an advertisement opportunity related to a publisher that provides advertisement exposure opportunities targeted towards adults.

The segmentation unit 112 may further receive input data 310, which includes at least information pertaining to audiences (i.e., audience information or user information) known by the system. By one embodiment, the segmentation unit 112 is configured to generate groups of like audiences (i.e., audience clusters). The generated audience clusters may, for instance, divide the supply for an ad consumption (e.g., users) into useful groups within a placement. For example, different audience clusters associated with a placement may be instructive in the sense that they are formed to allow the advertisement serving system to achieve a specifically defined performance with respect to content allocation.

Each audience cluster may include information associated with the cluster, e.g., attributes associated with the audience cluster such as demographics, past consumption information, and other features that may characterize the users in this audience cluster (e.g., sociographic, geographic, or common preferences). The audience clusters can be additionally facilitating in some scenarios when they have some kind of significant skew (e.g., tendencies) vs. baseline (e.g., demographic, KPI, etc.) and if the behavior of users in the cluster is more predictable. Such skew may be used to allow an allocation system to pick and choose pockets of KPI performance or other characteristics so that it can deliver advertising campaigns in an optimal manner. For example, the segmentation unit 112 generates audience clusters that have skew along certain dimensions that advertisers or other entities care about (e.g., high demographic skew towards a particular age/gender, high viewability or click-through-rate skew, etc.).

The demand information received from the advertiser system 108 may also include constraint information related to an advertisement campaign, such as a requirement for having a mix of audiences with a specific split of desired goal of 70% viewability and 30% CTR. The segmentation unit 112 may further receive forecast information from the estimation unit 114 that enables the segmentation unit 112 to generate audience clusters in accordance with the forecasts which is estimated based on optimization. For instance, the estimation unit 114 may obtain information corresponding to previous user interaction information with respect to prior advertisements. Such access information may encompasses different platforms and different media types so that the estimation unit may derive more precise forecasts across a variety of media and platforms. For example, the estimation unit 114 may receive PC-based access information, mobile-based access information, television-based access information, and other access information, and by utilizing certain prediction models (described later with reference to FIG. 7A) to provide forecast information pertaining to the performance of audience clusters with respect to different desired performance criteria.

In some embodiments, the access history information may also be used which may include information identifying users that have accessed one or more placements (e.g., anonymously without any personally identifiable information or in other manner), information identifying attributes associated with the users (e.g., gender attributes, geographical location attributes, operating system attributes, retargeting attributes, historical behavioral actions and tendencies, or other attributes), information identifying content accessed by the users or content sources that provided the content accessed by the users, information identifying times at which such accesses occurred or length of such accesses, or any other relevant information. By one embodiment of the present teaching, the access history information may be utilized to predict exposure opportunities or placement opportunities, where the prediction may be based on the previous ad requests, or other exposure opportunities predicted for the placement. The predicted exposure opportunities may be associated with attributes (or other characteristics) representative of users that previously accessed the placement or is predicted to access the placement in the future.

By one embodiment, upon receiving the forecast information from the estimation unit 114, the segmentation unit 112 may order a plurality of audience clusters that are identified for an opportunity to generate ordered audience clusters. Specifically, the segmentation unit 112 ranks the generated audience clusters for each corresponding advertisement exposure opportunity based on the above described forecast information. Details regarding the generation of the ordered audience clusters are described later with reference to FIG. 5A.

In online operation, the segmentation unit 112 transmits information related to the generated ordered audience clusters of advertisement exposure opportunities to the allocation unit 116, and the estimation unit 114 transmits information about the predicted performance of the ordered audience clusters, e.g., with respect to the KPIs, to the allocation unit 116. The allocation unit 116 then derives allocation information (i.e., which advertisement, ad-campaign, or a portion of an ad-campaign is to be assigned to an audience cluster of which exposure opportunity) based on the prediction information from the estimation unit 114, demand information, supply information related to one or more advertisement exposure opportunities, and/or other information. Details regarding the implementation of the allocation unit 116 are described later with reference to FIG. 9A. It should be appreciated that the prediction information that is determined by the estimation unit 114 may include other information related to predicted characteristics of audience groups, predicted characteristics of placements, predicted win rates of bid prices/times, etc.). Details regarding the various predictions performed by the estimation unit 114 are described later with reference to FIG. 7B.

To enable serving of advertisements, the allocation unit 116 sends, upon deriving instructions for matched demand and supply, i.e., an assignment/allocation of advertisement campaigns to advertisement opportunities, the instructions to the serving unit 118 to execute the placement of advertisements according to the allocation. Accordingly, the serving unit 118 provides or serves the advertisement (or other content) to one or more publisher systems 106 based on the allocation instructions received from the allocation unit 116. In some embodiments, various types of feedback information may be collected after the serving. Examples of such feedback information may include information related to placements at the allocated exposure opportunities, such as the content served, user activities or actions resulting from placements of the content, or any other feedback that may be provided by serving unit 118. Such collected feedback information may then be logged by the data logging unit 120.

Figure 3B:
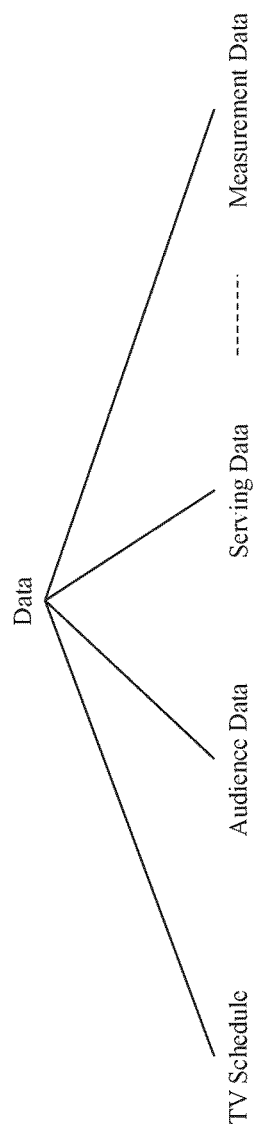
FIG. 3B illustrates an exemplary types of data, in accordance with various embodiments of the present teaching.

The data logging unit 120 processes the feedback information as discussed herein to generate further information that may be used to continually enhance segmentation unit 112, estimation unit 114, or other component(s) of the system. For example, estimation unit 114 may utilize the feedback information to adapt its forecast result and the segmentation unit 112 may then utilized the updated forecast information to further enhance the ordered audience clusters, both of which may then enable the allocation unit 116 to achieve dynamically adapted and optimized allocation. According to one embodiment of the present teaching, as depicted in FIG. 3B, data 310 may include a plurality of information including audience data, a television schedule information (which may be used for allocation purposes), the served data by the serving unit 118, and measurement data related for instance, to the data consumption information of the ordered audience cluster(s).

By one embodiment, the data logging unit 120 may provide the allocation unit 116 real-time execution information related to the placement of advertisements to the ordered audience clusters. Such real-time execution information may be utilized by the allocation unit 116 to update or modify allocations of future advertisements to the cluster(s). For example, in the execution of a certain advertisement campaign, which is to be performed in a certain time period, the data logging unit 120 may provide the allocation unit 116 information related to, for instance, a group of users who were served on a particular day. Based on this information, the allocation unit 116 may accordingly modify (i.e., ramp-up or ramp-down) the number of allocations of advertisements of the ad-campaign in the next round to achieve certain effect. For example, the allocation unit 116 may avoid to repeatedly distribute similar types of advertisements to a group of users who have previously seen advertisements of the similar types.

Additionally, as depicted in FIG. 3A, the advertisement distribution system 300 also includes the account profiling unit 320, which is capable of providing appropriate profile information about accounts of varying granularities, e.g., some account corresponding to individuals, some corresponding to households, some corresponding to certain social groups, etc. In operation, the account profiling unit 320 receives as input, data 310 as well as consumption data from third party sources, analyzes the received data, and generates profiles for accounts of audiences (i.e. users) at different granularity levels. The account profiling unit 320 may profile different accounts based on profiling criteria, to generate persistent account profiles 340. By one embodiment, the profiling criteria may correspond to preferences of the account, whether it is an individual or a group of individuals such as a household or a social group, determined based on, e.g., data consumed by the users in the account across different devices, platforms, or media types and the activities observed from such users exhibited with respect to the products they consumed, whether it is content or advertisements.

Furthermore, the account profiling unit 320 may also generate data sets 330 associated with the accounts in a manner that is persistent across different platform, media types, and devices. Each data set in 330 may include information pertaining specifically to the users belonging to the account (persistent) e.g., devices used by the users to consume the data, characterization of the data consumed, space and time of the consumption, activities that may be used to characterize the user preferences, etc. Based on such data sets, the account profiling unit 320 may profile the accounts of different granularities in a persistent and more accurate manner.

By one embodiment, the data sets 330 and the persistent account profiles 340 may be input to the segmentation unit 112, the estimation unit 114, and the single source panel 370. The single source panel unit 370 may be configured to retrieve persistent account data and profile and display such information collected across platforms, devices, and media types in a coherent and associated manner to enable unified usage of otherwise disconnected and incomplete pieces of scattered information. In this manner, the advertiser system 108, and/or the publisher system 106 may utilize the integrated and coherent data via the single source panel unit 370 to determine, which accounts may be selected as targets based on the source constraints (i.e., constraints related to the publisher system) and/or demand constraints (i.e., constraints related to the advertiser system) to achieve optimized gain, whatever the goal of the gain is defined at the time. Thus, the generated data sets 330, and the persistent account profiles 340 may enable for instance, the segmentation unit 112, and the estimation unit 114 to perform their respective functions at a dynamically varying granularity level according to the needs, thus enabling the content distribution system 300 to allocate content in an optimal and efficient manner. Details regarding the account profiling unit 320 and the single source panel unit 370 are described later with reference to FIGS. 13A, 13B, 14, and 15, respectively.

Figure 4A:
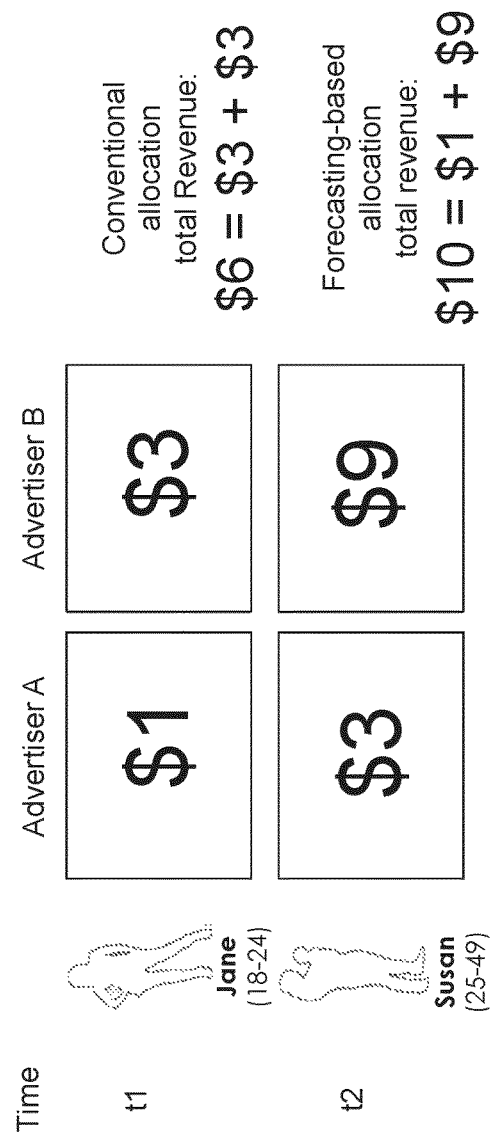
FIG. 4A illustrates an example related to allocation optimization, according to an embodiment of the present teaching.

FIG. 4A illustrates an example related to allocation optimization, according to an embodiment of the present teaching. Specifically, FIG. 4A illustrates one of the issues that advertisement distribution systems face and the present teaching addresses. As shown, there are two advertisements, advertiser A and advertiser B, that are to be distributed at different times, i.e., t1 and t2. Assume also that there are two users, Jane and Susan, to whom the advertisements A and B can be allocated. The constraint is that each user is to receive only one of the advertisements A and B. Both advertisements A and B are available for placement on the platform under consideration at either time t1 or t2. At t1, either advertisement A or B may be allocated to Jane. But once one advertisement is allocated to Jane, there is only one remaining that can be allocated to Susan at t2. The question is which advertisement is to be allocated to Jane at t1. Assuming some information predicting the gain from each allocation is available. As illustrated in FIG. 4A, if advertisement A is allocated to Jane, the gain is $1.0, and if advertisement B is allocated to Jane, the gain is $3.0. However, if advertisement A is allocated to Susan, the gain is $3.0, and if advertisement B is allocated to Susan, the gain is $9.0.

A conventional greedy algorithm maximizes the gain at each time instance without considering any forecast information on, e.g., who may show up when. Given that, at time t1, a conventional greedy algorithm maximizes the gain by allocating advertisement B to Jane because it yields a larger gain of $3.0 (which is higher than $1.0 if advertisement A is allocated to Jane.). In this case, at time t2, the only advertisement that can be allocated to Susan is advertisement B, with a gain of $3.0. So the total predicted return at t2 is $6.0 ($3.0+$3.0). Such a greedy algorithm achieves only local maximum because if the allocation at t1 to Jane is advertisement A, the total return at t2 will be $10.0 ($1.0 from allocating advertisement A to Jane and $9.0 from allocating advertisement B to Susan at t2.). Thus, the conventional greedy algorithm cannot maximize the gain because it does not consider forecast information as to who may become available for advertisement allocation.

The present teaching, however, aims to achieve optimal allocation that maximizes the gain. Based on data collected from multiple sources, the estimation unit of the present teaching generates forecast information, including information about which user likely will show up at which platform and at what time. With such forecast information available, the allocation may be carried out to optimize the return. For example, as shown in FIG. 4A, if the forecast information indicates that Susan likely will show up at t2, then the allocation decision at t1 will take into account of what is coming up, i.e., in this case, Susan will show up later. Knowing that, the allocation unit of the present teaching proceeds to allocate advertisement B to Susan at a later time so that at time t1, the only advertisement that can be allocated is advertisement A to Jane even though it is not the optimal decision at t1. In this way, the total gain is $10.0 ($1.0+$9.0).

The above described forecasting may be performed by the estimation unit 114 of FIG. 3A by implementing one or more machine learning algorithms as forecasting models, which may be derived based on time series analysis, random forests, logistic regression, regression splines, support vector machines, and the like. In an embodiment, the one or more forecasting models may have adaptive learning capabilities. As an example, the forecasting models may adapt based on feedback information from a feedback loop that gather feedback data by monitoring system performance. Such feedback information facilitates the forecast models to achieve improved forecasts. In an embodiment, outlier detection (i.e., anomaly detection) can be performed that allows for the identification of unusual, catastrophic events or other outliers. The detection of such outliers may, for example, allow such outliers to be removed from consideration or given less weight during the segmentation, estimation, allocation, or other processes.

Figure 4B:
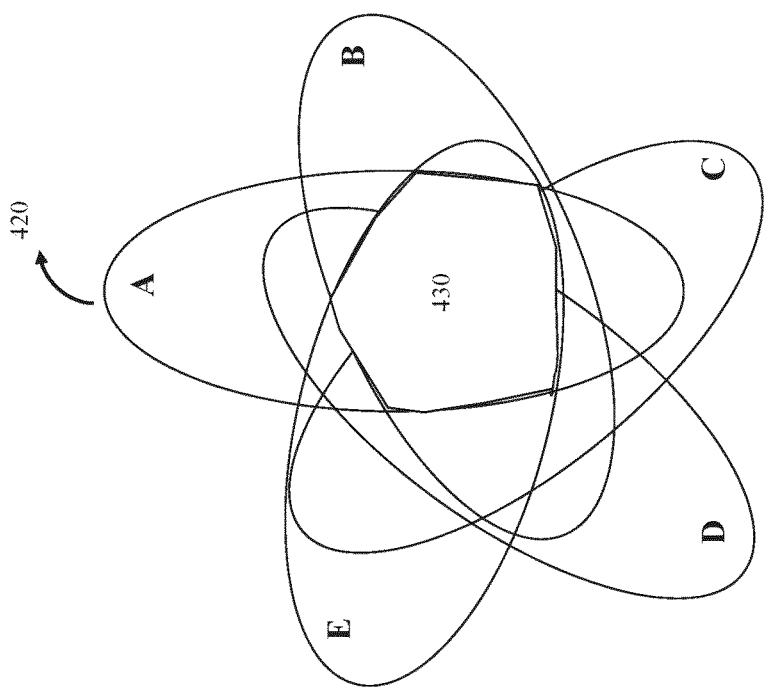
FIG. 4B illustrates a challenge confronted by advertisement serving system, according to an embodiment of the present teaching.
Figure 4B:
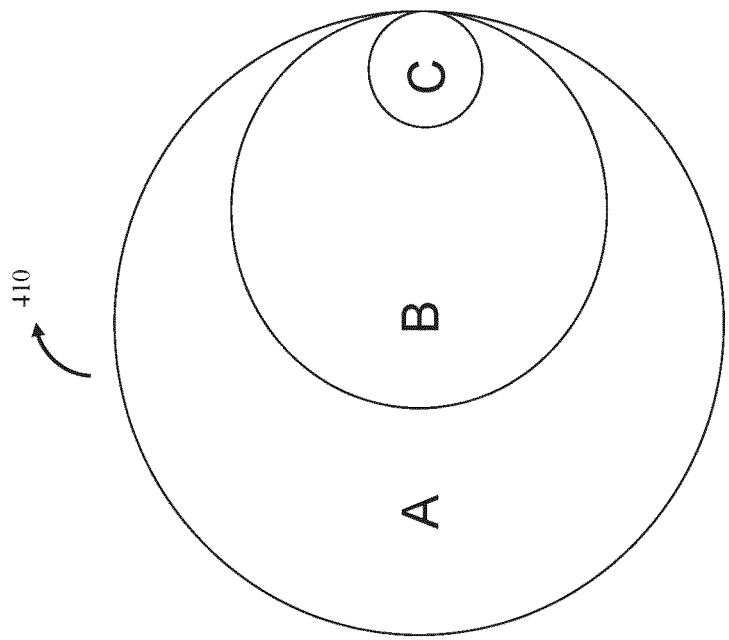

FIG. 4B illustrates a challenge confronted by advertisement serving system, according to an embodiment of the present teaching. Specifically, the challenge is that audiences (i.e., users) cannot be considered in a vacuum, when the reality is that overlap amongst users. When considering overlap, one objective is to avoid over promising at planning time, which often leads to under-delivery and campaigns cannibalizing from each other at execution time. As shown in FIG. 4B, the example on the left 410 is a simple one, e.g., Campaign A wants to target women who are 18-34 years old, Campaign B wants to target women who are 18-34 years old and like fashion, and Campaign C wants to target women who are 18-34, like fashion, and watch "Keeping Up with the Kardashians.". Clearly, these three target groups have an overlap and they form a nested overlap situation as shown 410 in FIG. 4B. Thus, when planning the allocation for three campaigns, such overlap needs to be considered and addressed to prevent over-delivery to some audience users. For example, for this example, one solution to such overlap may be, e.g., subtracting out the exposure opportunities (e.g., impressions) for Campaigns B and C when guaranteeing exposure opportunities to Campaign A.

The overlap scenarios in real world can have many more varieties and are rarely as simplistic as what is illustrated herein. For example, 420 as shown on the right in FIG. 4B illustrates a more complex overlap scenario. Scenario 420 depicts various different overlap scenarios arising from five targeted audience groups (A, B, C, D, and E). For example, region 430 corresponds to an overlap among audience groups A, B, and E. To remove redundancy, such overlaps need to be detected. By on embodiment, a technique derived from graph theory called community detection, may be used to identify the overlaps, and then used for allocation purposes. In some embodiments, some overlaps may be ignored (e.g., when it involves very small number of users) and some may need to be considered in determining allocation, which may be provided to, e.g., segmentation, estimation, and allocation units. More details will be provided below.

Figure 5A:
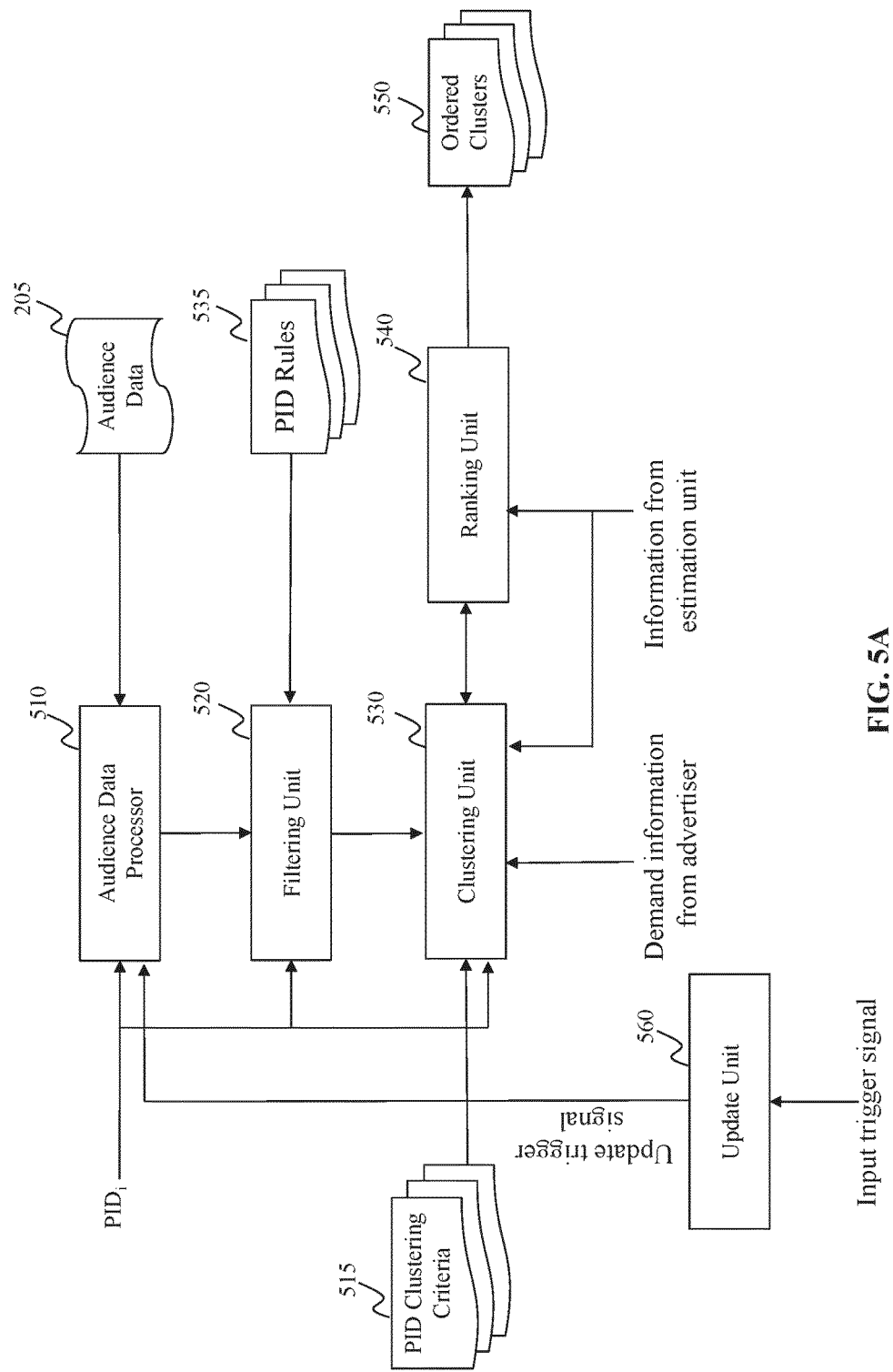
FIG. 5A depicts an exemplary block diagram of a segmentation unit, according to various aspects of the present teaching.

FIG. 5A depicts an exemplary block diagram of the segmentation unit, according to various aspects of the present teaching. The segmentation unit 112 includes an audience data processor 510, a filtering unit 520, a clustering unit 530, a ranking unit 540, and an update unit 560. As discussed herein, the segmentation unit 112 is configured to generate ordered audience clusters that are to be assigned to an advertisement exposure opportunity. The segmentation unit 112 forms the audience clusters with the goal of achieving maximized gain, and the clusters are formed also in consideration of various constraints imposed by the publisher system 106 as well as the advertiser system 108.

By one embodiment, the audience data processor 510 identifies each advertisement exposure opportunity based on a prediction derived, e.g., by the estimation unit 114 (described later with reference to FIGS. 7A and 7B). The advertisement exposure opportunity may include metadata with an identifier (i.e., the placement identifier (PID)), as well as information related to, e.g., supply-side constraints or other information. The audience data processor 510 may also receive information pertaining to the audience i.e., from the audience data 205. The received audience data form an audience space with respect to the opportunity represented by the corresponding PID.

The audience data processor 510 processes, with respect to the PID and related metadata associated with the opportunity, the audience data. Such pre-processed audience data may then be filtered. The filtering unit 520 prunes the audience space to remove audience data that do not qualify for the underlying opportunity. By one aspect of the present teaching, the filtering unit 520 may use PID rules 535, to prune the audience space to filter out certain audience data. For example, the PID rules 535 may specify criteria that any audience data need to meet in order to be linked to the exposure opportunity. Examples of such criteria may include, e.g., a threshold related to a specific KPI. Another example is a specified threshold of volume. With the required KPI, audience data that cannot meet the KPI requirement will be removed. Similarly, with required volume, any audience data that will not offer sufficient volume will also be filtered out. There may be other criteria that the PID rules may specify. Each PID may have its corresponding rules so that the audience clusters for each PID may be customized with respect to the specific constraints of the corresponding exposure opportunity.

The filtered result, i.e., remaining audience data in the audience space for each PID may then be clustered. This is performed by the clustering unit 530. In the illustrated embodiment, the clustering unit 530 may generate audience clusters (i.e., audience groups) based on different types of information from different sources. For example, the clustering unit 530 may receive previous demand information from an advertiser system 108 and certain forecast information from the estimation unit 114. Examples of the forecast information from the estimation unit 114 may include, for instance, certain expected performance that an audience cluster may achieve and such expected performance may be specified in the form of metrics such as KPI.

Optionally, prior demand information associated with the same PID may be used to assist the clustering unit 530 to generate ordered audience clusters. For instance, prior demand data associated with this PID may specify that the audience for this PID needs to have the potential to achieve 70% viewability requirement and 30% CTR requirement. Such requirements may be used to select audience groups to make sure that the selected audience groups can meet such requirements. This may be achieved by examining the information received from the estimation unit. For example, the estimation unit 114 may provide, for each audience group, some estimated performance measures. For instance, for audience group "soccer moms,", "teenagers," etc., different viewability and CTR measures may be provided as the estimated performance of each group. Based on such information, the clustering unit 530 may identify audience clusters that meet the desired performance measures. Each audience cluster may be a collection of one or more audience groups, each of which may be associated with estimated performance measures that meet the required performance measures. Audience groups whose estimated performance measures do not meet the required performance metrics may then be excluded, or will not be included in the audience clusters for the PID.

Moreover, the clustering unit 530 may also be configured to determine, for each PID, what is the appropriate number of audience clusters to be assigned to the advertisement exposure opportunity. Such a decision may be made based on a PID clustering criteria 515, which may specify, e.g., minimum/maximum cluster sizes allowed for each audience cluster. With the procedure described herein, the clustering unit produces a number of audience clusters, which may then be ordered, as described below, based on additional conditions.

The ranking unit 540 of the segmentation unit 112 is configured to rank the audience clusters generated by the clustering unit. The ranking may be performed based on the prediction from the estimation unit 114 on the ability of each audience cluster (derived by the clustering unit) to realize the gain. For example, the prediction information received from the estimation unit 114 may indicate that the audience cluster "soccer moms" is expected to achieve a higher KPIs of viewability and/or CTR as compared to that of the audience cluster "teenagers" is expected to achieve. Accordingly, the ranking unit 540 may then rank the "soccer moms" audience cluster higher than the "teenager" audience cluster. In some embodiments, the ranking unit may generate different ordered audience clusters based on different performance requirements. For example, it may generate one ordered audience clusters based on CTR related performance metrics and another ordered audience clusters based on viewability related performance metrics. In this manner, when an actual demand is received, depending on the required performance of the demand, different ordered audience clusters may be used to determine the clusters for the allocation with improved online or on-the-fly allocation efficiency.

Once the ordered audience clusters (one or more) are generated, they can be updated over time. The update may be directed either to the order of the audience clusters, or be directed to the audience clusters themselves. For example, if ordered audience clusters are determined initially with respect to a KPI related performance metrics such as CTR, but later data indicate that it seems that the recent trend is that viewability is a much widely accepted performance metrics, in this case, the order of the clusters may be re-determined with respect to viewability. Similarly, the audience clusters may also need to be re-generated based on new popular performance metrics.

Figure 5B:
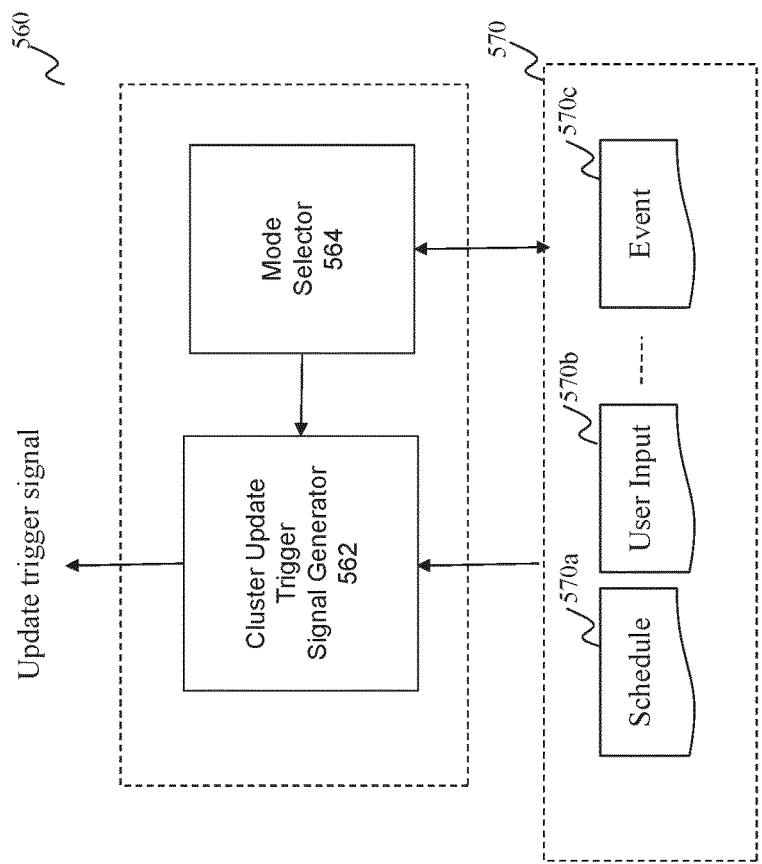
FIG. 5B depicts an exemplary block diagram of an update unit, according to various aspects of the present teaching.

In the illustrated embodiment, the update unit 560 of the segmentation unit is be configured to update (i.e., modify) the previously generated ordered audience clusters. The update may be triggered by an input trigger signal. FIG. 5B depicts an exemplary system diagram configured for generating an update trigger signal, according to an embodiment of the present teaching. As seen in FIG. 5B, the exemplary update unit 560 includes a cluster update trigger signal generator 562, and a mode selector 564. There may be different modes that can be used to control when to trigger update. To enable each mode, as shown in 570, triggering conditions may be respectively specified which, once met, activate the cluster update trigger signal generator 562 to generate a trigger signal. For example, as shown in FIG. 5B, there may be a mode in which update is triggered based on a schedule 570a, based on a manual user input 570b requesting explicitly an update, or based on occurrences of some pre-defined events 570c.

In some embodiments, the mode selector 564 may first determine a current mode to be used for controlling the update and then instruct the cluster update trigger signal generator 562 to accordingly look up whether the condition (s) set for the selected mode are met. For example, if the mode selector 564 sets the mode of update according to a schedule, the cluster update trigger signal generator 562 then looks up the schedule 570a to see when the schedule is met and generates a trigger signal. Alternatively, if the selected mode is based on some event, the cluster update trigger signal generator 562 then checks the event(s) defined in 570c and the occurrence, when the pre-defined event occurs, the cluster update trigger signal generator 562 then generates an update trigger signal. If the mode is for explicit user input, the cluster update trigger signal generator 562 waits until there is an input from an administrator activating an update and then generates an update trigger signal.

In some situations, the update can be directed to a derivative modification of the ordered audience clusters. In some situations, the mode selector 564 may also be configured to select whether the update is directed to modification or re-generation. As discussed above, an update may be to modify the ordered audience clusters, either the order of the clusters or the composition of the clusters. An update re-generation requires the audience clusters be re-created from a clean slate i.e., re-generate anew a set of audience clusters. By one embodiment, such a determination may be made based on the input received, e.g., from an administrator. It may also be determined based on, e.g., some pre-defined catastrophic event such as computer crash, etc. As another example, if there is a change in the demands received, indicating thereby that there is a sharp change of performance requirements, the mode selector may also determine to elect the clean slate mode to update the clusters. Through these modes, the segmentation unit 112 may dynamically update the ordered audience clusters associated with different PIDs to adapt to the changing environment.

Through such an update mechanism, the segmentation is dynamic, continuous, and adaptive based on the dynamic situations observed. As indicated herein, the segmentation result are also fed to the estimation unit so that the predictions and forecasts with respect to the audience clusters are also dynamic, continuous, and adaptive. The adaptive behavior of both the segmentation unit and the estimation unit then also enables the allocation performed by the allocation unit to be dynamic, continuous, and adaptive, to optimize the performance and the gain of the system.

By one embodiment of the present teaching, the segmentation unit 112 generates the ordered audience clusters by the mechanism described above for each predicted advertisement exposure opportunity PID. The advertisement exposure opportunity may be predicted based on access history information including PC-based access information, mobile-based access information, television-based access information, and other access information. In some embodiments, the access history information includes information identifying users that have accessed one or more placements, information identifying attributes associated with the users (e.g., gender attributes, geographical location attributes, operating system attributes, retargeting attributes, historical behavioral actions and tendencies, or other attributes), information identifying content accessed by the users or content sources providing content accessed by the users, information identifying times at which such accesses occurred or length of such accesses, or other information. Moreover, the access history information may be used to predict exposure opportunities for a placement (e.g., ad requests previously obtained from the placement, ad requests predicted to be obtained from the placement where the prediction is based on the previous ad requests, or other exposure opportunities predicted for the placement). The predicted exposure opportunities may be associated with attributes (or other characteristics) representative of users that previously accessed the placement or is predicted to access the placement in the future.

In this manner, the segmentation unit 112 generates ordered audience clusters to be associated with each advertisement exposure opportunity and it may be done offline so that a much more diverse range of data may be considered, processed, and used to optimize the performance by identifying the most appropriate audience clusters for each PID that can deliver the optimized gain during online operation. In doing so, the offline optimization process is able to consider a large sum of data to achieve better prediction and forecast and support more precise identification of audience clusters and order them to facilitate much more efficient online operation on the fly with optimized performance without delay the real time process.

Figure 5C:
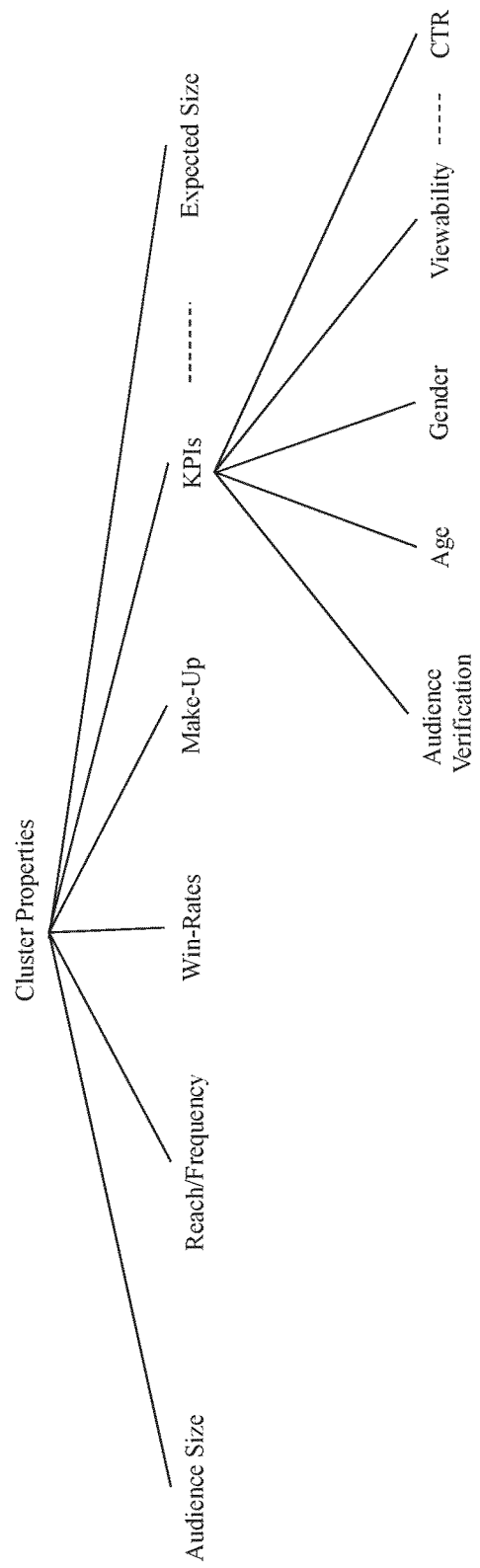
FIG. 5C illustrates exemplary types of cluster properties, in accordance with various embodiments of the present teaching.

Each audience cluster may be associated with various properties or metadata characterizing the features of the cluster. FIG. 5C illustrates exemplary types of cluster properties, in accordance with various embodiments of the present teaching. As can be seen from the figure, a cluster may be characterized by, e.g., size of the cluster (e.g., number of users included in the cluster), reach and frequency of the cluster, win-rates of the cluster, make-up of the cluster (e.g., professionals in the age group of 24-35), various measures related to KPI, etc. The performance of an audience cluster with respect to any of the above listed properties can be predicted by the estimation unit 114 based on access history information, demand information, supply information, or other information.

Such properties are used during the allocation process to allocate advertisements or other content items to appropriate exposure opportunities. For example, if a particular campaign is targeting audience having certain properties (e.g., KPI, audience size, reach, exposure levels, order conversion rate (OCR) performance, validated Campaign Essentials (vCE) performance, etc.), the allocation unit 116 may match the properties of different audience clusters with the targeted requirements to identify audience clusters that meet the campaign objectives. The audience cluster properties as depicted in FIG. 5C may be collected from different sources such as the feedback from the system, estimated by the estimation unit 114 based on data collected, or information provided by the allocation unit.

Figure 6:
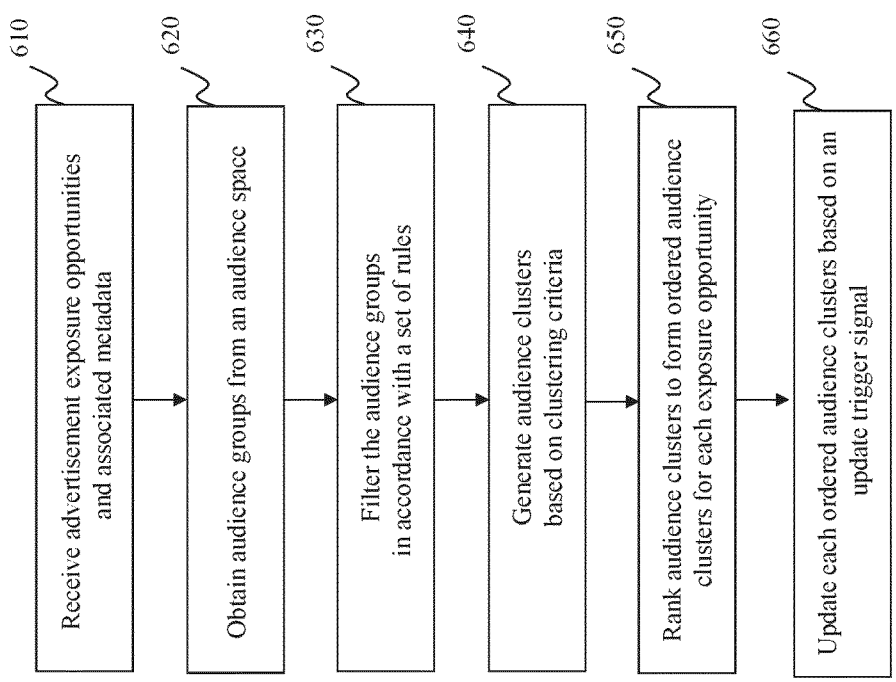
FIG. 6 is a flowchart of an exemplary process of the segmentation unit, in accordance with various embodiments of the present teaching.

FIG. 6 is a flowchart of an exemplary process of the segmentation unit, in accordance with various embodiments of the present teaching. The process commences in step 610, wherein the segmentation unit 112 receives advertisement exposure opportunities and metadata associated with each of the advertisement exposure opportunity. Each of the advertisement exposure opportunity is identified by a corresponding PID, and includes metadata including information related to, e.g., supply constraints or other information.

In step 620, for each advertisement exposure opportunity, the segmentation unit obtains audience groups from an audience space. Specifically, by one embodiment, the segmentation unit retrieves all potential audience groups such as "soccer moms", "teenagers", "elderly people" etc., from the audience space. Note that each of the audience groups is associated with certain properties or attributes as described previously with reference to FIG. 5C. The process further proceeds to step 630, wherein the obtained audience groups are filtered in accordance with a set of rules. For instance, as stated previously, the filtering unit included in the segmentation unit 112 may filter the audience group space based on criteria associated with the advertisement exposure opportunity.

Further, in step 640, for each advertisement exposure opportunity, the process generates audience clusters based on clustering criteria. For instance, the segmentation unit 112 may filter the audience clusters based on a minimum/maximum cluster size criteria, thresholds related to KPIs or other criteria associated with the advertisement exposure opportunity.

The process in step 650 ranks the audience clusters to form ordered audience clusters (for each advertisement exposure opportunity) based on some ranking criteria. For instance, the ranking of the audience clusters may be performed based on anticipated demand constraints (e.g., advertiser's constraints). Specifically, the ranking may be based on forecast information received from the estimation unit 114. The forecast information may correspond to an expected performance with respect to an attribute (i.e., KPI) associated with the anticipated demand. Further, the process in step 660 updates the ordered audience clusters for each advertisement exposure opportunity when an update trigger signal is received, as described previously with reference to FIG. 5B.

Figure 7A:
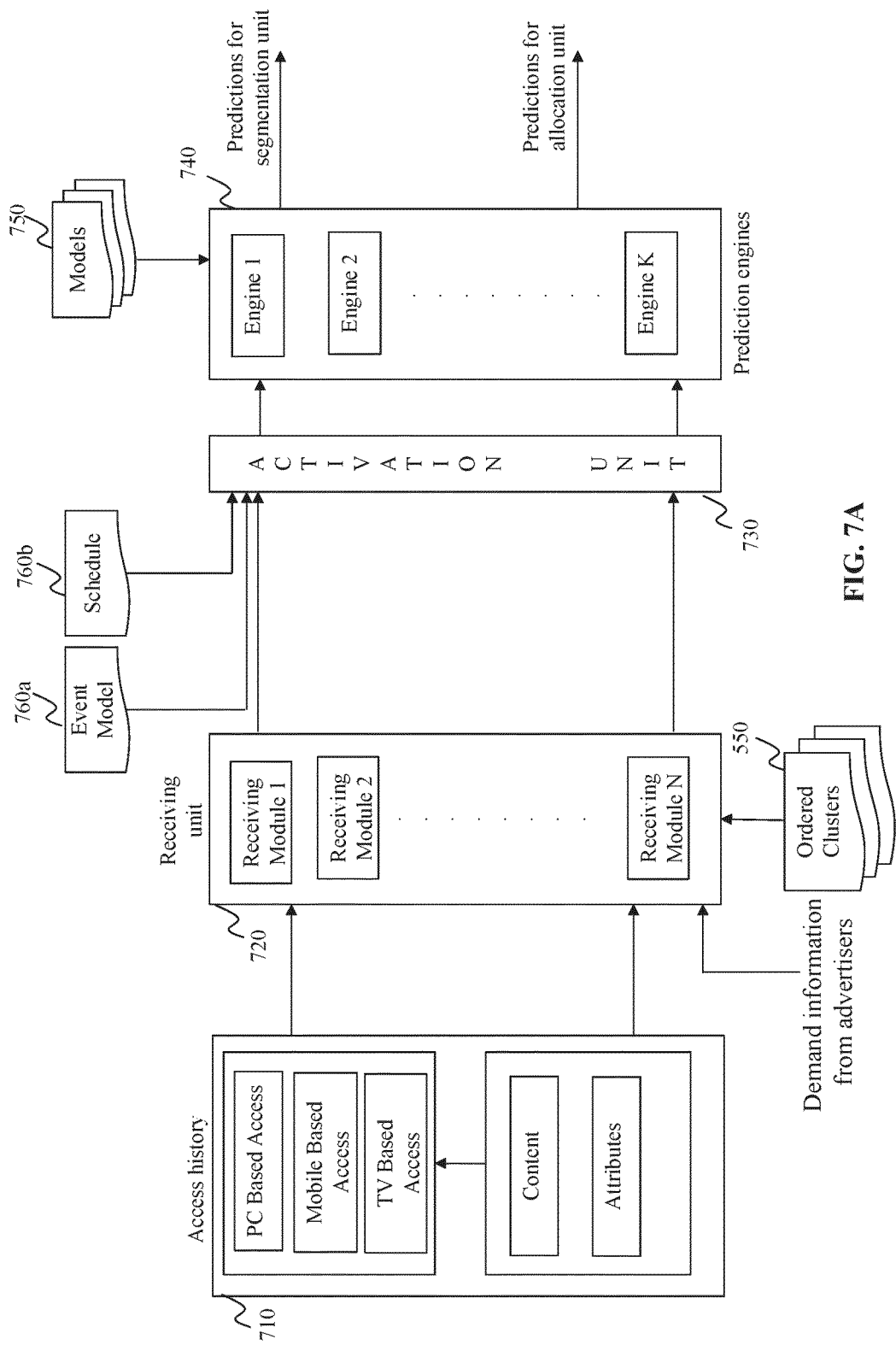
FIG. 7A depicts an exemplary block diagram of an estimation unit, in accordance with various aspects of the present teaching.

FIG. 7A depicts an exemplary block diagram of the estimation unit, in accordance with various aspects of the present teaching. As discussed herein, the estimation unit 114 estimates various parameters relevant to the operation of the system, e.g., predictions of parameters/attributes of an advertisement exposure opportunity, characteristics of audience clusters, or other predictions or forecasts that can be used during the allocation process to allocate advertisements or other content items to the advertisement exposure opportunity.

By one embodiment, the estimation unit 114 includes a receiving unit 720 comprising a plurality of receiving modules, an activation unit 730, a plurality of prediction engines 740, as well as an event model 760*a*, a schedule 760*b*, and prediction models 750. Based on those predicted relevant characteristics, audience clusters for each exposure opportunity can be more accurately and optimally generated during the offline operation, and the advertisements (or other content items) may be allocated during the online allocation to facilitate campaigns to achieve their respective commercial objectives by selecting, for each exposure opportunity, the appropriate audience clusters for optimal advertisement placement(s).

In an embodiment, predictions are made based on data previously accessed by users. For example, content accessed by users (as well as attributes related to the accessed content such as consumption time, content type, etc.) can be collected across different device types i.e., content accessed via PC, mobile, television, etc., different platforms, and different media types. Such access information 710 may be stored in an access history database. In this way, allocation of advertisements (or other content items) based on the foregoing estimation may be optimized for campaigns across different media types, different device types, etc.

The previously accessed content by the users, demand information from advertisers, and information from the segmentation unit (e.g., information related to the ordered audience clusters) can be received by the receiving unit 720 for further processing. Note that the demand information received from the advertisers may pertain to requirements of a particular advertisement campaign. As shown in FIG. 7A, the receiving unit 720 includes a plurality of receiving modules. Each module may be configured to receive data from a particular source (i.e., segmentation unit, advertisers, or access history database) or alternatively, each receiving module may receive data from different sources. Based on such received information, the estimation unit 114 predicts the parameters/attributes based on at least one prediction model 750. Specifically, by one embodiment, the activation unit 730 may function as a controller and activate a particular engine (e.g., engine 1 to engine K of the prediction engines 740) to forecast predictions for the segmentation unit and/or the estimation unit. The prediction engines 740 utilize prediction models 750 that can implement one or more machine learning algorithms as forecasting models. The forecasting models may be derived based on time series analysis, random forests, logistic regression, regression splines, support vector machines, and the like.

In some embodiments, the estimation unit 114 may perform the estimation or forecasting whenever certain conditions are met. Such conditions may be based on a regular schedule specified in a schedule model 760b. In some embodiments, such conditions may be related to some pre-defined events specified via an event model 760a. That is, the estimation unit may be configured to respond to triggers, which are activated when the conditions specified in such models are met. Exemplary conditions may be when a certain amount of feedback has been obtained/processed, when demand information or supply information has changed, or when objectives related to demand or supply have changed, etc.

In what follows, there is described with reference to FIG. 7B exemplary predictions estimated by the estimation unit 114 in accordance with various embodiments of the present teaching. As shown in FIG. 7B, the estimation unit 114 generates prediction information based on access history information, audience group information, and other information such as demand information, supply information, bid history information, other currently running campaigns, or other information. For instance, access history information may be used to predict or forecast features/characteristics related to an advertisement exposure opportunity, predict or forecast a request volume associated with a particular placement request (i.e., demand), etc.

Figure 7B:
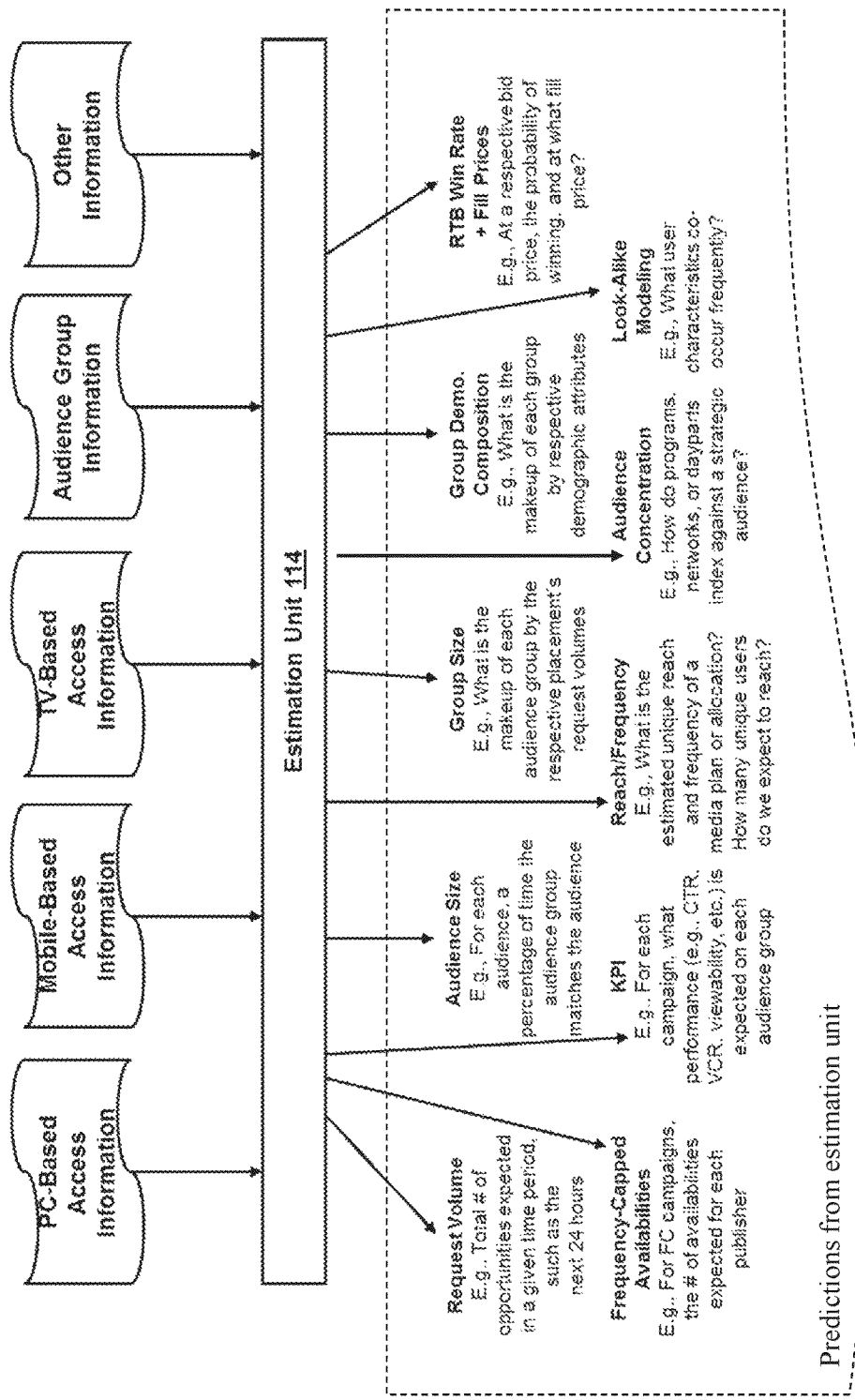
FIG. 7B depicts exemplary predictions from the estimation unit, in accordance with various embodiments of the present teaching.

As shown in FIG. 7B, the estimation unit 114 may predict: (1) request volume for a placement request or total number of exposure opportunities expected in a given time period, (2) cluster size within the placement (e.g., with respect to each cluster, a percentage of time the cluster matches demand requirements), (3) size of an cluster (e.g., makeup of each cluster with respect to the placement's request volume), (4) group demographic composition of the cluster within the placement (e.g., makeup of each cluster by respective demographic attributes, such as gender, age, income, life-cycle stage, neighborhood and dwelling, ethnicity, etc.), (5) real-time bidding win rate and fill prices (e.g., at a respective bid, the probability of winning and the fill price of the winning bid), (6) frequency-capped availabilities (e.g., for frequency-capped campaigns, the number of availabilities expected for each publisher, for each placement, etc.), (7) KPI with respect the cluster (e.g., for each campaign, the performance expected on each cluster, such as click-through rate, video completion rate, viewability, digital activation, in store purchasing behavior, etc.), (8) reach (e.g., unique reach of a media plan or allocation, duplicated reach of a media plan or allocation, etc.), (9) frequency (e.g., frequency with which a user is shown the same advertisement during a set time period, etc.), (10) cluster concentration (e.g., the percentage of the total viewing audience of a program, network, or daypart that falls within the strategic audience of interest), (11) look-alike modeling (e.g., user characteristics that co-occur frequently and the probabilities of such co-occurrences for the user characteristics), or (12) other items.

By one embodiment, feedback related to one or more placement with respect to the corresponding exposure opportunities, content served (e.g., advertisements) in response to a demand with respect to the exposure opportunities, user activities directed to the content placed, or other feedback can be used to update predictions of estimation unit 114. As discussed herein with reference to FIG. 3A, the data logging unit 120 may obtain such feedback data from serving unit 118 (or other source), process the feedback data to derive useful information from the feedback data, and provide the derived useful information to the estimation unit 114. As such, the estimation unit 114 can dynamically update its predictions based on continuously provided feedback information. The feedback information may be provided to the estimation unit in a periodic manner, e.g., in accordance with a schedule, or in response to one or more other conditions or triggers being satisfied.

Figure 8:
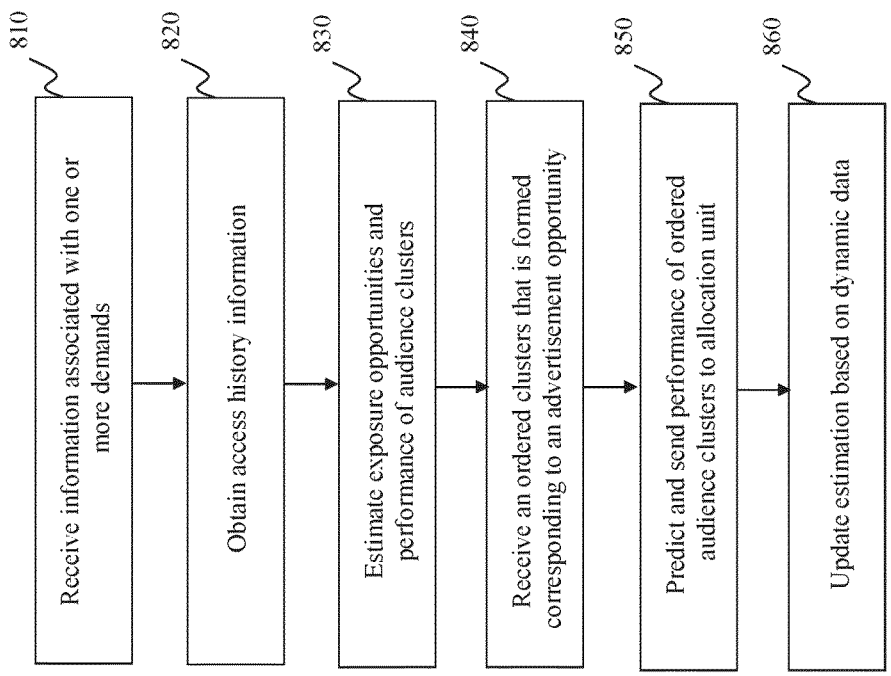
FIG. 8 illustrates a flowchart of an exemplary process of the estimation unit, in accordance with various embodiments of the present teaching.

FIG. 8 illustrates a flowchart of an exemplary process of the estimation unit, in accordance with various embodiments of the present teaching. The process commences in step 810, wherein the estimation unit 114 receives information associated with one or more demands e.g. the advertisement campaigns. As stated previously, information associated with the demands may include demand side constraints such as information identifying one or more key performance indicators (KPIs) or other objectives for one or more campaigns e.g., KPIs or other objectives related to volume, demographics, click-through rate, etc., for individual campaigns or for a set of campaigns and/or other information.

In step 820, the estimation unit obtains access history information related to the content previously placed and accessed by users. The access history information may describe content accessed by users, different devices used to access the content, attributes associated with the users (e.g., gender, geographical location, operating system, retargeting, historical behavioral actions and tendencies, or other attributes), times at which such accesses occurred or duration of such accesses, or other information. Note that the access history information may be used to predict, in accordance with at least one prediction model, various features as illustrated in FIG. 7B.

The process further moves to step 830, where the estimation unit estimates advertisement exposure opportunities, anticipated performance of the audience clusters and such estimations may be derived with respect to different performance metrics such as KPI measures anticipated in connection with demands. The predictions or forecasts may be derived based on the access history information obtained in step 820, and the demand information received in step 810. In step 840, the estimation unit receives information related to ordered audience clusters associated with an advertisement exposure opportunity, where the ordered audience clusters may be generated by the segmentation unit 112. The estimation unit 114 predicts, in step 850, the performance of the ordered audience clusters with respect to some performance metrics and then sends the predicted performance to the allocation unit 116. This facilitates the allocation unit 116 in utilizing such predicted information in the optimal allocation of advertisement campaigns to various advertisement exposure opportunities. Further, in step 860 the estimation unit updates, once triggered (e.g., by an update trigger signal), the estimation of various types of information based on dynamic data. Note that the update trigger signal is activated when some pre-defined conditions are met.

Figure 9A:
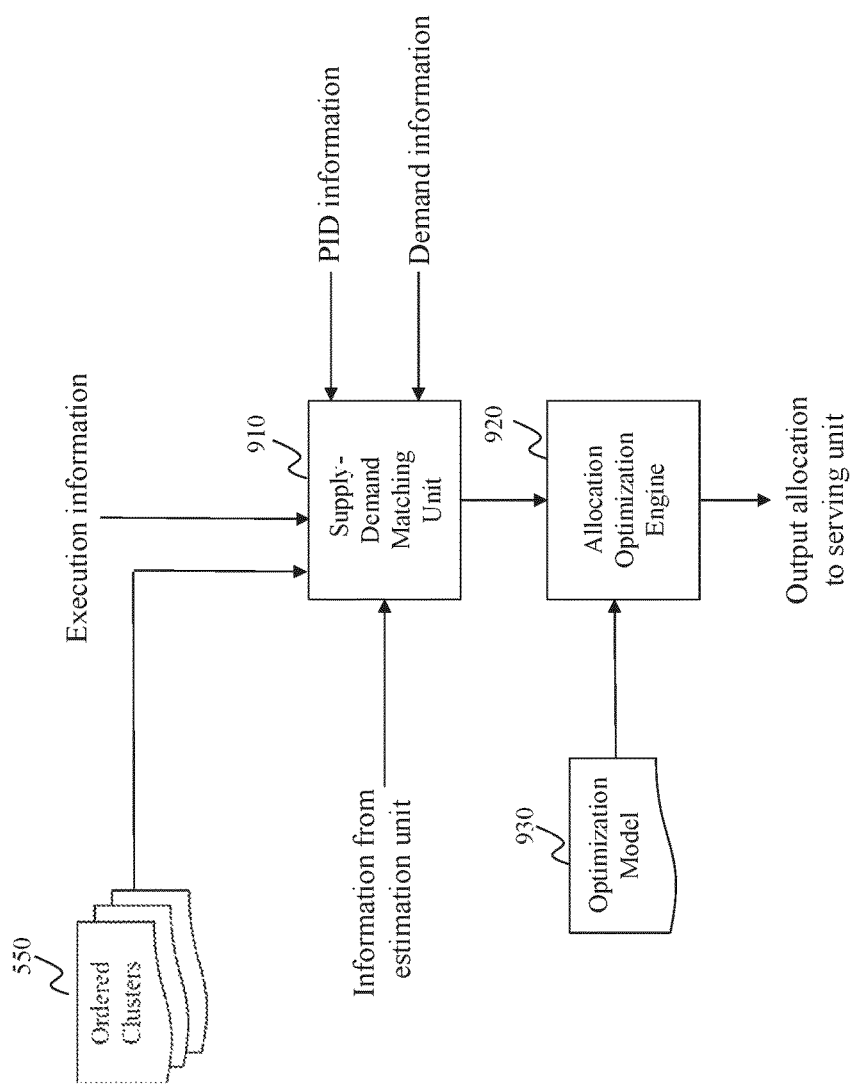
FIG. 9A depicts an exemplary block diagram of an allocation unit, in accordance with various aspects of the present teaching.

FIG. 9A depicts an exemplary block diagram of the allocation unit, in accordance with various aspects of the present teaching. The allocation unit 116 comprises a supply-demand matching unit 910 and an allocation optimization engine 920. In operation, when the supply-demand matching unit 910 receives a demand, it accesses PIDs, the exposure opportunities, and ordered audience clusters with metadata associated with each exposure opportunity. To assess whether which exposure opportunity is suitable to place advertisement (demand), the supply-demand matching unit 910 also receives various information related to expected or predicted performance of different audience clusters provided by the estimation unit. Such different types of information received from different sources are then used by the supply-demand matching unit 910 to identify the best exposure opportunity and the best audience cluster(s) to place the advertisement so that the demand criteria (e.g., required reach, performance, etc.) may be optimally met.

Figure 9B:
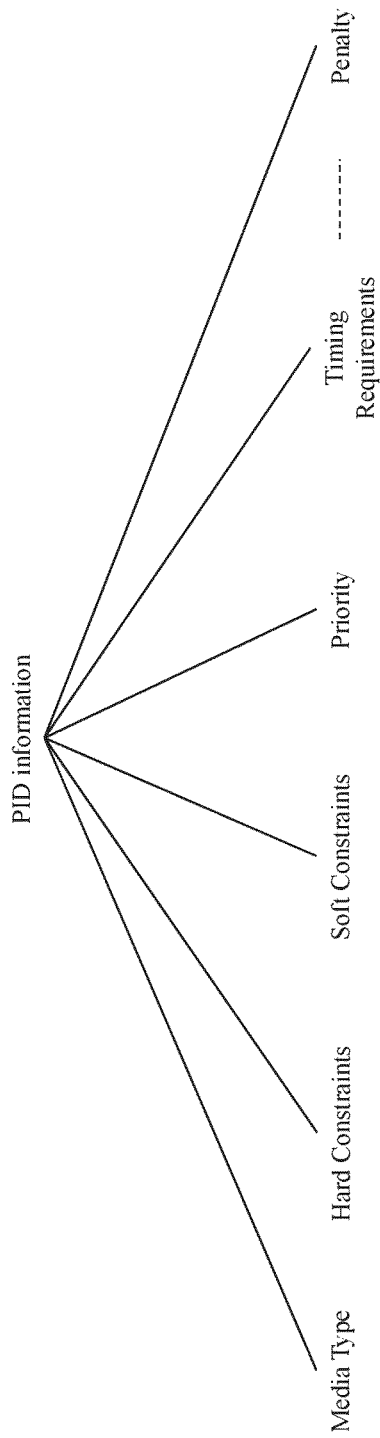
FIG. 9B illustrates exemplary types of information associated with an advertisement request, in accordance with various embodiments of the present teaching.
Figure 9C:
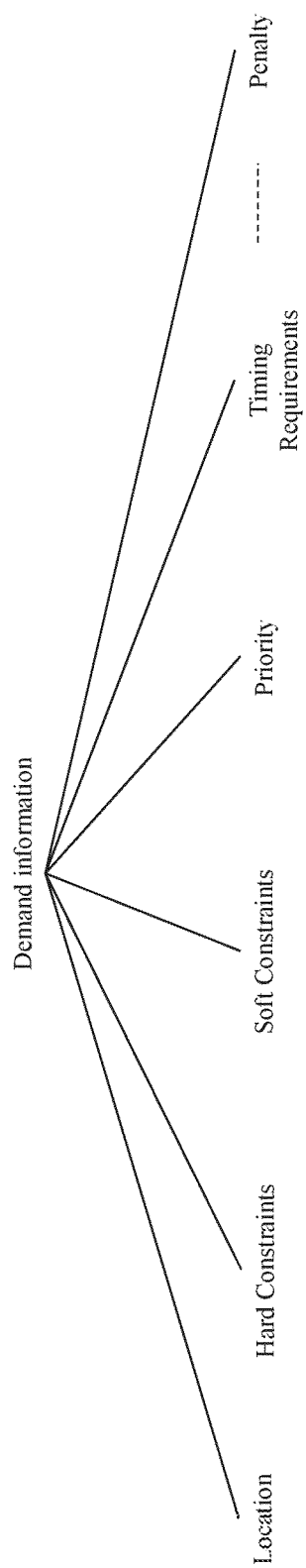
FIG. 9C illustrates exemplary types of attributes associated with a demand, in accordance with various embodiments of the present teaching.

For example, the allocation unit 116 may take into account one or more predictions of each ordered audience clusters (e.g., the respective characteristics as depicted in FIG. 5C), the supply information i.e., PID information, and the demand information. As shown in FIG. 9B, the PID information can include information related to media type, hard or soft supply side constraints (e.g., publisher constraints), priority associated with the exposure opportunity, timing requirements of the exposure opportunity, penalty associated with the hard and/or soft supply side constraints. Similarly, referring to FIG. 9C, the demand information can include information related to location (e.g., a preferred advertisement opportunity where the demand seeks to be placed), hard or soft demand side constraints (e.g., advertiser constraints), priority associated with the demand (e.g., priority of a particular advertisement campaign), timing requirements of the advertisement campaign(s), penalty associated with the hard and/or demand side constraints, etc.

The supply-demand matching unit 910 processes the above described input information and triggers the allocation optimization engine 920, which computes an allocation of the demand (e.g., advertisement campaigns) to the supply (e.g., ordered audience clusters corresponding to advertisement exposure opportunities) in accordance with an optimization model 930. It must be appreciated that any allocation computed by the allocation optimization engine 920 ensures that none of the constraints (i.e., supply side and demand side constraints) are violated, and that an overall objective function such as minimizing penalties (e.g., monetary or other penalties) over the set of campaigns, maximizing revenue, profits, or other monetary gains from the campaign set as a whole, or other objective functions are achieved. Moreover, the supply-demand matching unit 910 receives real-time execution information related to the serving of advertisements (or advertisement campaigns) to the ordered audience clusters, e.g., from the data logging unit 120 as shown in FIG. 3A. Such real-time execution information may be utilized by the allocation unit 116 to update or modify allocations of future advertisements to the ordered audience clusters as described previously.

Figure 10:
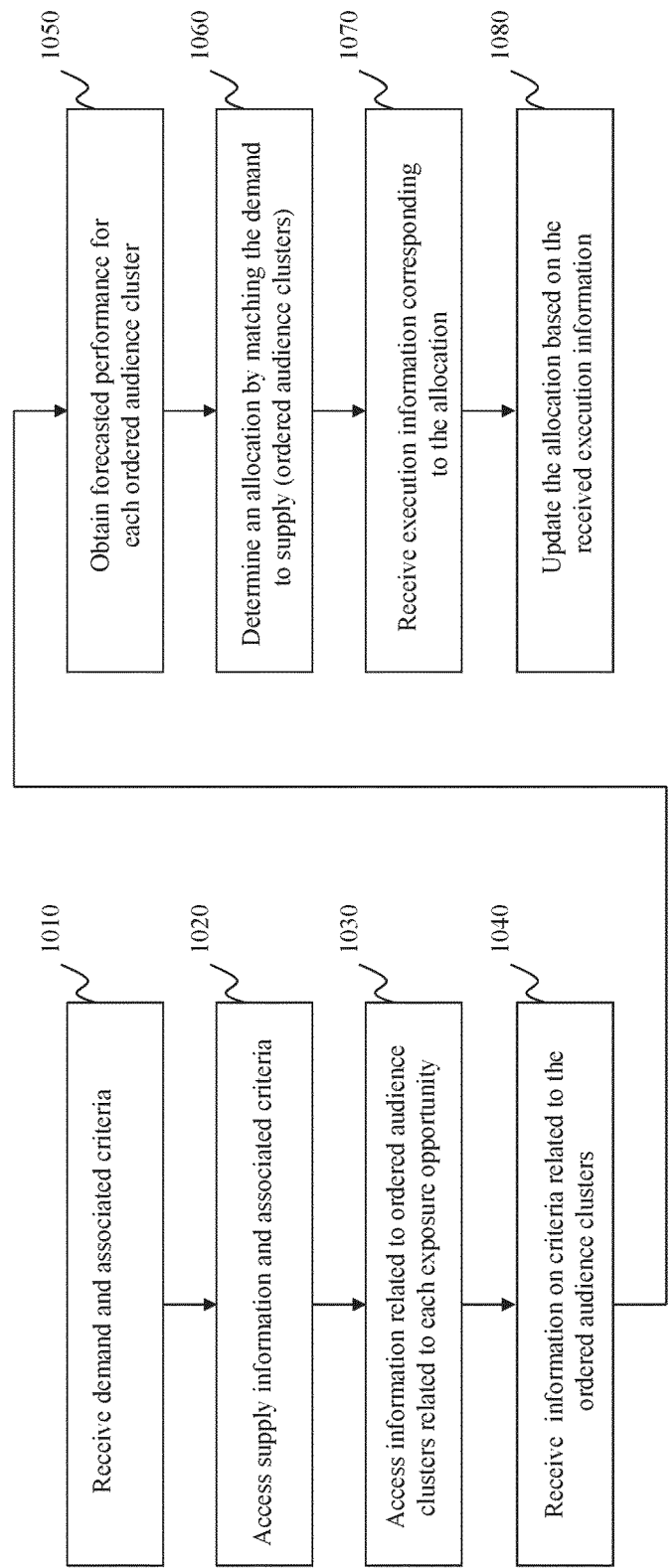
FIG. 10 is a flowchart of an exemplary process of the allocation unit, in accordance with various embodiments of the present teaching.

FIG. 10 is a flowchart of an exemplary process of the allocation unit, in accordance with various embodiments of the present teaching. The process begins in step 1010, wherein the estimation unit receives a demand and associated criteria such as target audience information, expected performance, constraints, etc. In step 1020, to match the demand with supply, the allocation unit accesses supply information as well as associated criteria (e.g., platform, media, and other constraints). For any supply that may be further considered, the allocation unit further accesses, in step 1030, information about the ordered audience clusters associated with each exposure opportunity and, in step 1040, receives information on criteria or measures related to the ordered audience clusters. In addition to the information related to supply, the allocation unit also accesses information from the estimation unit. In step 1050, the forecast performances for the ordered audience clusters are obtained.

With information related to demand, supply, and predictions accessed and available, the allocation unit determines, in step 1060, an optimal allocation of demand to supply by matching the expected performance metrics/constraints of the demand with the predicted performance/constraints of the supply and the specific audience cluster(s) based on the optimal model. Note, that the optimization model computes the allocation of advertisement campaigns to the ordered audience clusters while ensuring that none of the criteria associated with the advertisement campaigns and the advertisement exposure opportunities are violated. As discussed preciously, the computed allocations may be forwarded to the serving unit to execute the allocations. Further, in step 1070, the allocation unit receives from the serving unit, the execution information related to the serving of the advertisement campaigns, and updates the allocations based on the received execution information in step 1080 as described previously.

Figure 11:
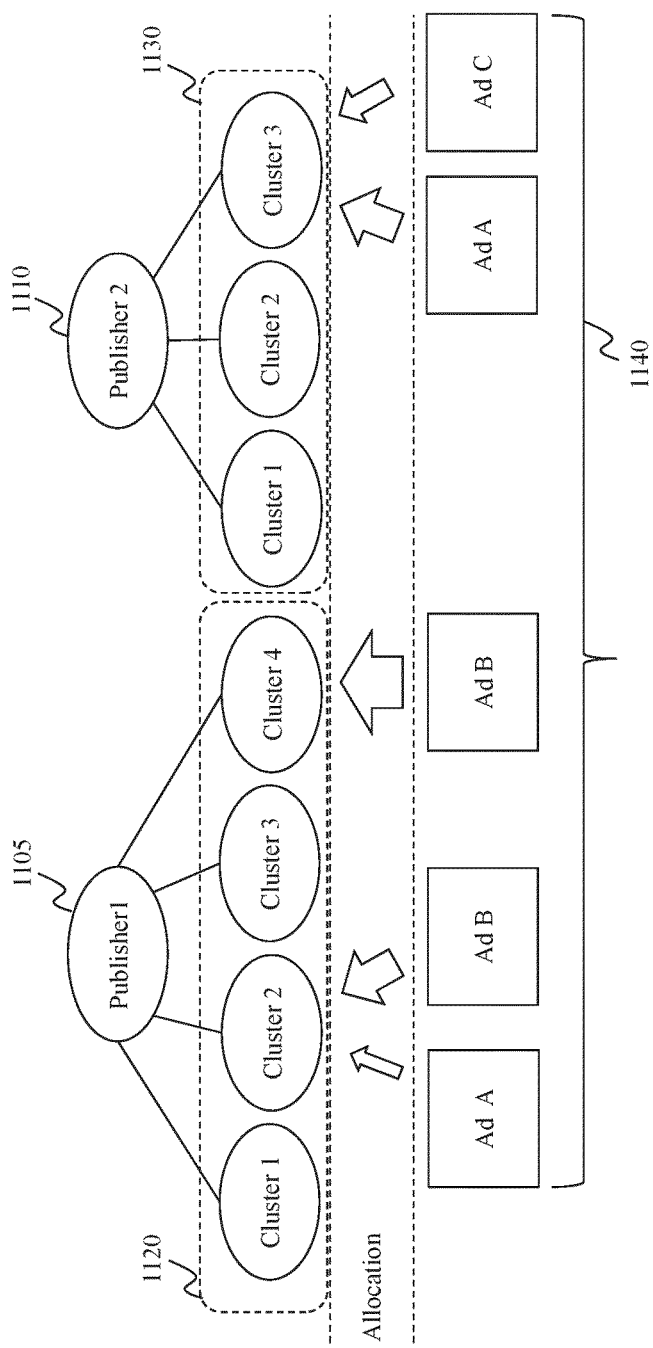
FIG. 11 illustrates exemplary content allocation scenarios, in accordance with various embodiments of the present teaching.

FIG. 11 illustrates exemplary content allocation scenarios, in accordance with various embodiments of the present teaching. In this illustrated example, there are two advertisement placement opportunities 1105 and 1110, presented by publisher 1 and publisher 2, respectively. As described previously, the segmentation unit 112 is configured to generate ranked (i.e., ordered) audience clusters for each of the placement opportunities. As shown in FIG. 11, publisher 1 is depicted as having ordered audience clusters 1120 with exemplary 4 clusters, and publisher 2 is depicted as having ordered audience clusters 1130 with 3 clusters. Further, the demand on different media 1140 such as advertisements, ad-campaigns, etc., are to be allocated by the allocation unit 116 to the audience clusters based on constraints as described next.

By one embodiment, the allocation unit 116 allocates advertisements in different media types to audience clusters for placing the advertisements to achieve campaign objectives based on description of targeted audience (e.g., attribute sets), mapping rules, predicted characteristics of, e.g., the audience clusters and the placement opportunities, various constraints, including demand constraints (e.g., indicated by the demand information) and/or supply constraints (e.g., an amount of expected advertisement opportunities or other constraints indicated by the supply information), or any other information. Based on the allocations computed by the allocation unit 116, the serving unit 118 serves the content e.g., advertisements in their respective media to respond to identified audience clusters at selected exposure opportunities. The allocations may then be provided to a serving unit as instructions to be followed, by either the internal serving unit 118 or the external serving unit 128 (FIG. 1), to execute the allocations by delivering the advertisements to matched audience clusters at selected exposure opportunities.

As shown in the example in FIG. 11, advertisements A and B are allocated to cluster 2 of a placement opportunity associated with publisher 1, 1105, whereas advertisement B is allocated to cluster 4 of another placement opportunity associated with publisher 1. In a similar manner, advertisements A and C are allocated to cluster 3 of a placement opportunity associated with publisher 2, 1110. As seen, the same advertisement may be allocated to more than one cluster, associated with one or more placement opportunities. As also shown in FIG. 11, the width or size of each arrow may be used to indicate the amount of media allocated to a target cluster and the amount of allocated content may correspond to a number of impressions of the digital content that are made to users in a particular cluster. Note that a determination of different amounts of content to be allocated to different audience clusters may be made to meet certain criteria such as maximizing the net return in investment and the like.

As discussed herein, the advertiser systems 108, and likewise the publisher systems 106, aim to achieving content reachability to a specific group of targeted users so that certain desired performance measures can be met. In the advertising world, it is to place each advertisement at a platform with a most promising exposure opportunity at the right time and duration to deliver the advertisement to the right audience to yield a maximum gain. With reference to the previous figures, various mechanisms and processing units are disclosed, primarily in connection with the segmentation unit, estimation unit, and the allocation unit in terms of how they operate and collaborate to achieve optimized performance. Such optimization relies on the collected data about, e.g., users, platforms, audience clusters, etc. The quality of such optimization may depend on the quality of the data collected. For example, with respect to users or audience, to understand their likings, routines, or behaviors, it is important to gather information about the users from all sources, e.g., user's habit with respect to different devices, user's consumption behavior observed on different platforms, user's interests exhibited at different times and locations, user's response patterns with respect to different types of content, etc. One obstacle to achieve that may be due to the facts that a user may have multiple devices, each with a possibly different identifier, and sign up on different platforms/systems/media types/apps to consume content with yet other different identifiers. Thus, there is a need to have a means to recognize that some data from different sources (devices/platforms/systems/media types/apps, etc.) corresponding to different identifiers correspond to a same underlying user.

In addition, the present teaching may target a user that is defined in a broader sense. For instance, a user can be an individual, a household, a group of people (e.g., a social group), or even an organization. So, there is a need to have a means also to recognize that some data, although with different identifiers or consumption activities, correspond to a user at a particular granularity. For example, a household may be a user account in the context of targeted advertising. To gather data related to a household user account, which has a coarser granularity than an individual, data related to different individuals in the household need to be linked together as a coherent data set, which can then be used to learn the profile of the household. Similarly, the same can be said about a social group. It is a challenge to cluster data related to a user account, which can be at different levels of granularity. It may involve gathering data related to each individual included in the account (e.g., individuals in the same household) across different devices/platforms/systems/media types/apps and then grouping the data related to such individuals to create the data associated with the user account.

In what follows, there is provided a mechanism to gather data for user accounts at different levels of granularity, and then profile such user accounts based on the data associated therewith. Such derived profiles for the accounts are persistent across different devices/platforms/systems/media types/apps so that they can be more effectively utilized by the optimization schemes described herein to determine content placement on different devices/platforms/systems/applications. For example, the profiles for accounts of households that have teenage children may be used in planning and scheduling placements of an advertisement related to a teenage movie. Specifically, profiles of accounts may be used by the previously described segmentation unit 112, estimation unit 114, and the allocation unit 116, in order to optimally allocate content to the accounts across different devices/platforms/systems/apps for the account users to consume and at the same time, maximizing the expected gain or return within the constraints presented.

Figure 12:
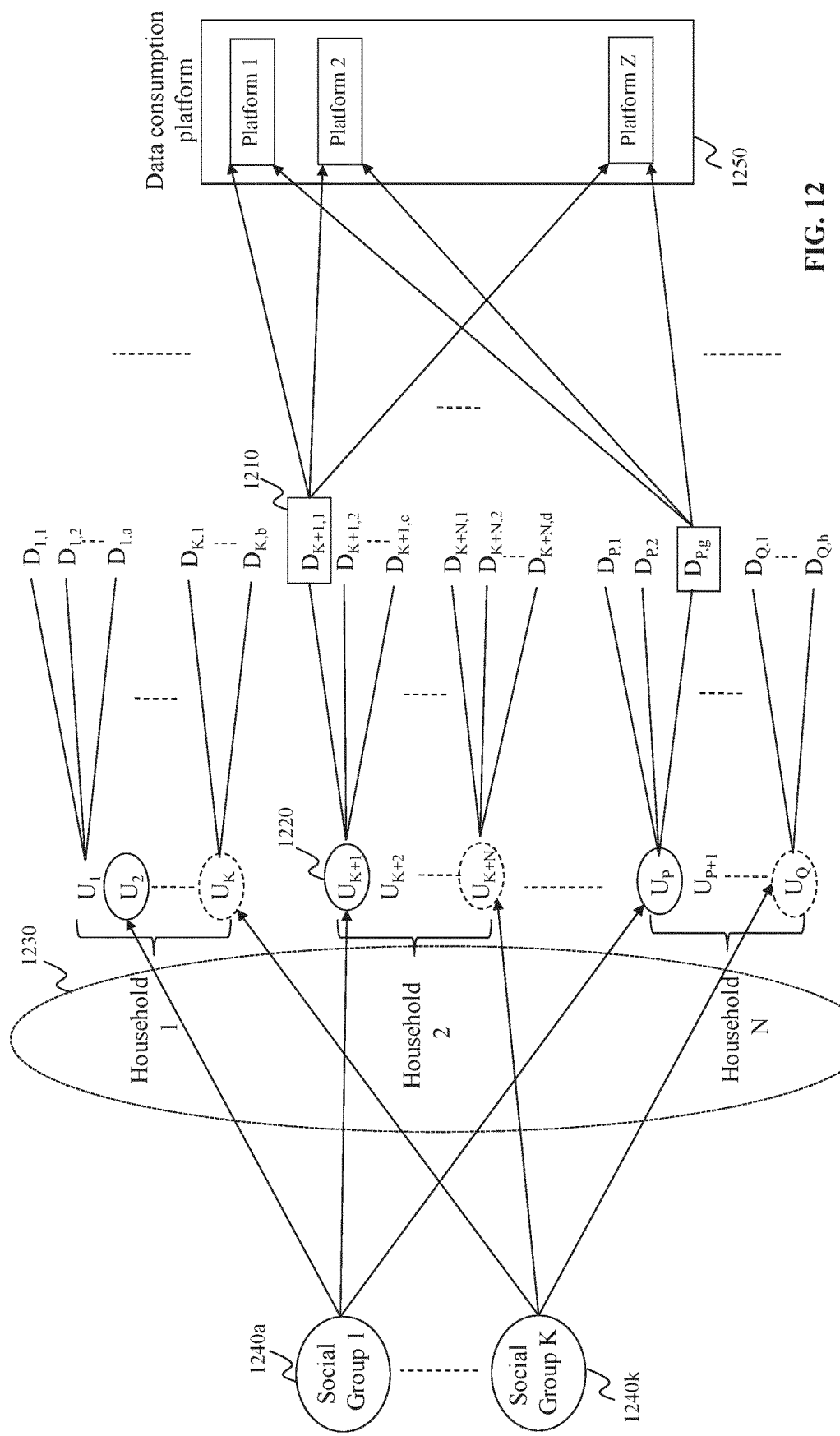
FIG. 12 illustrates exemplary types of user accounts at different granularity levels, in accordance with various embodiments of the present teaching.

FIG. 12 illustrates exemplary types of user accounts at different granularity levels, in accordance with various embodiments of the present teaching. This illustration shows user accounts at different granularities. For example, there are individual user accounts $U_1, U_2, \ldots, U_K, \ldots U_Q$. There are also user accounts at a coarser granularity for households 1230, with each household account including one or more individual user accounts. In addition, it is also shown that there may be accounts $1240a, \ldots 1240k$ corresponding to social group accounts at another level of granularity. As shown, each individual user (e.g., user $U_{K+1}$ 1220) may be associated with one or more devices 1210 (e.g., $D_{K+1,1}, D_{K+1,2}, \ldots, D_{K+1,c}$), which may correspond to, e.g., mobile device, desktop device, ..., and TV, where each of the devices may be used by the corresponding user to access and consume content on different platforms/systems/apps. For example, user 1220 is shown to use devices $D_{K+1,1}, D_{K+1,2}, \ldots, D_{K+1,c}$ to access content on different platforms 1, 2, and Z, respectively, which may correspond to Google, CNN.com, and Hulu.com. As discussed herein, a user may use different devices with different identifiers on each to access content. In addition, a user, when accessing content from different platforms, may use a different identifier for each platform.

User accounts at different granularities may or may not form a hierarchy. It must be appreciated that a user account of a particular level of granularity (e.g., a household) may include user accounts belonging to the household account, and the respective devices that are associated with each of the user accounts. This enables appropriate profiling of the accounts involved.

Figure 13A:
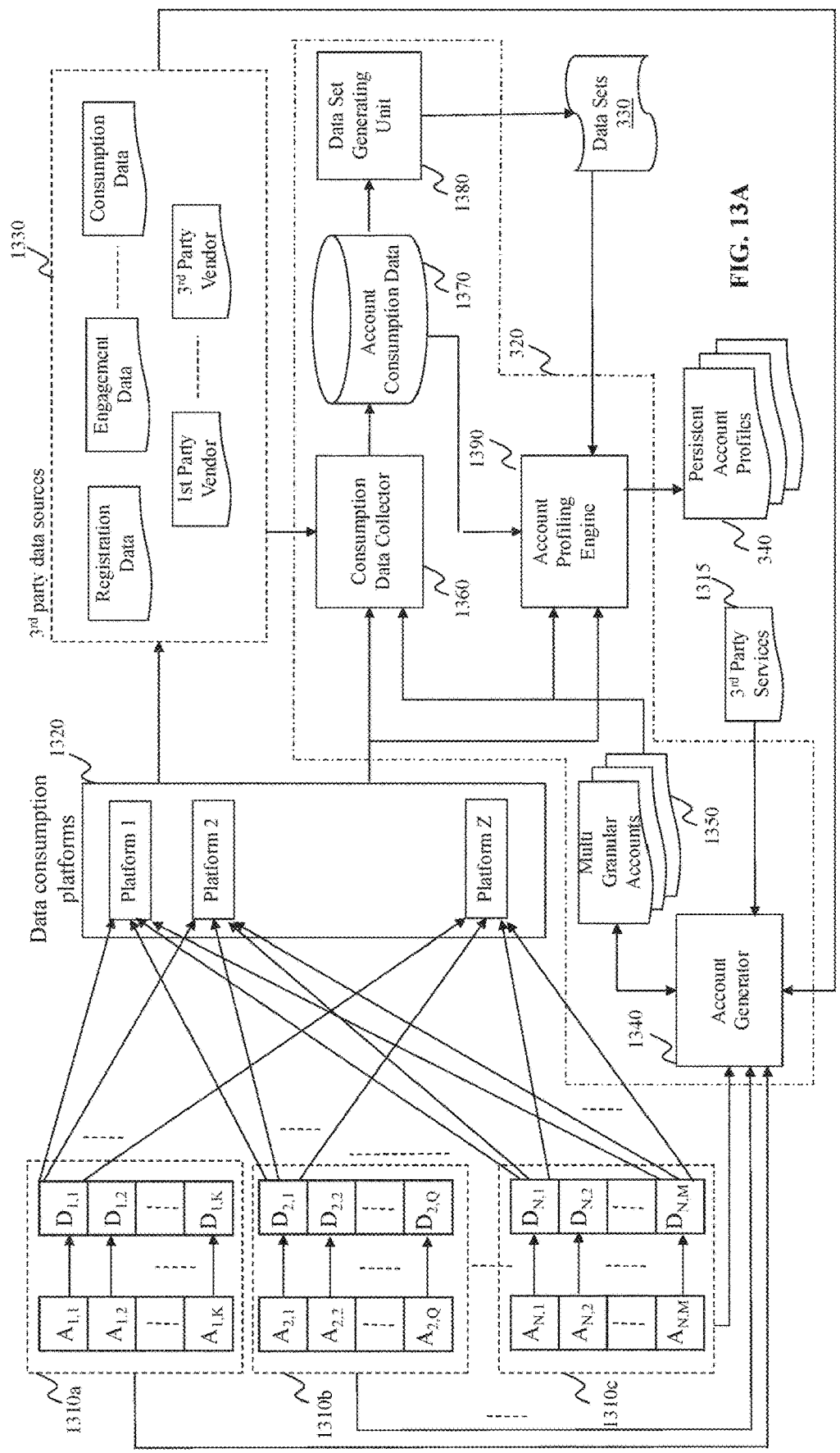
FIG. 13A illustrates a block diagram of an account profiling unit, in accordance with various embodiments of the present teaching.

FIG. 13A illustrates a block diagram of an account profiling unit, in accordance with various embodiments of the present teaching. The account profiling unit 320 is configured to gather, for each of the accounts at different granularities, content consumed by user on one or more devices that belong to the account, and profile the account based on the collected information for the account. The account profiling unit 320 includes an account generator 1340, a consumption data collector 1360, an account consumption database 1370, a data set generating unit 1380, and an account profiling engine 1390.

As shown in FIG. 13A, each account 1310a, 1310b, . . . 1310c may include one or more individual users, each of whom may be associated with multiple devices (generally denoted as $D_{i,j}$). Via such devices, individual users access and consume content on different platforms 1320, which may encompass different media channels/types, different websites, different systems, different applications, etc. Note that each user device may be associated with a corresponding device-account identifier (generally denoted as $A_{p,q}$). By one embodiment, information corresponding to the device-account identifiers $A_{p,q}$, and the respective devices $D_{i,j}$ is input to the account generator 1340.

The account generator 1340 generates multi-granular accounts 1350 (i.e., individual user accounts, household accounts, social group accounts, etc.) based on, e.g., information provided by third party services 1315. In some embodiments, the advertisement distribution system as described herein may also be able to, e.g., via content serving services, link different accounts (e.g., individual user accounts) at one granularity level with an account (e.g., household) at a different granularity level. For instance, in television field, third party services such as Nielsen may provide services which provide information on which individual users belong to the same household. In a similar manner, other third party services such as AT&T, Comcast, and the like can also provide information to the account generator 1340 about how accounts at one level of granularity are grouped to form an account at a different granularity level.

In generating the accounts for individual users based on such third party information, each individual account may now have, e.g., a universal identifier for the account with an associated, e.g., list of devices and identifiers belonging to the same individual user, which links different devices and identifiers used by the same individual user to be related to the same user so that the universal identifier for the account represents a catch-all identifier. Through such a catch-all identifier or account within the meaning of the present teaching, data relevant to the individual user may be gathered no matter which device the user uses to access or consume content, on what platform, in what media, or in which applications.

The third party information may also enable the account generator 1340 to determine which users (based on the mobile device records) belong to a particular account at a higher level of granularity. For example, information from third party social group operators such as Facebook may also provide information on which individual user accounts form a social group and the identifiers associated with such social groups. As such, the account generator 1340 creates not only individual user accounts but also accounts at other granularity levels such as household or social group. The generated accounts at different levels of granularity are saved in a multi-granular account storage, which are then used for collecting consumption data related to each account. With each account including all devices and identifiers associated with the account, the collection of all relevant data is made possible.

The consumption data collector 1360 is configured to collect, for each account in 1350, consumption data related to the account. Such collection is performed based on the account information, which includes an associated list of devices, identifiers, platforms, etc., such that the consumption data can be gathered across devices, platforms, media types, etc. In addition, when an account includes multiple individual users, the consumption data for the account may also be performed across all of its member users. That is, the consumption data collector 1360 is configured to obtain content consumed by the users in that account on their respective devices and accessed across a plurality of platforms 1320. The obtained consumption data is stored in the account consumption database 1370.

Figure 13B:
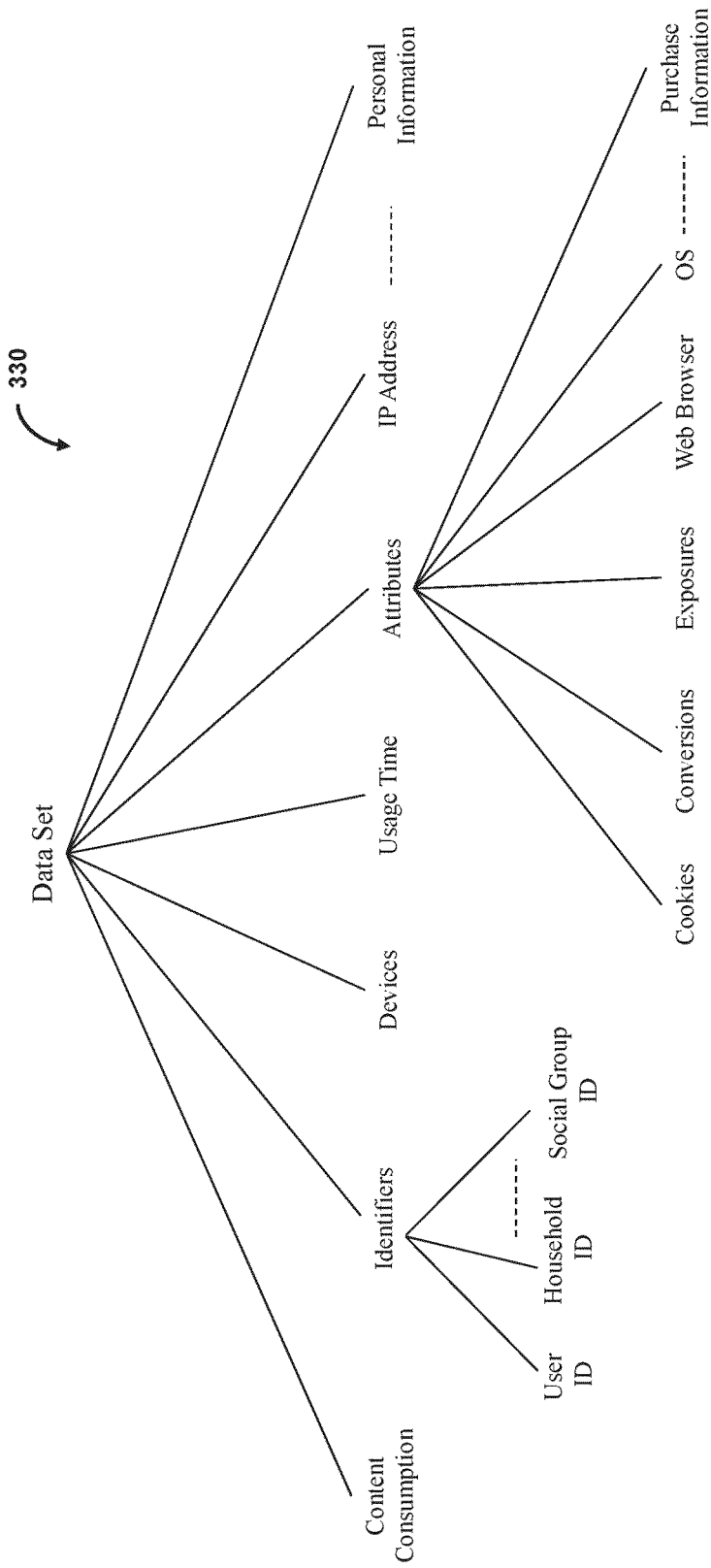
FIG. 13B illustrates exemplary types of information included a data set for an account, in accordance with various embodiments of the present teaching.

The data set generating unit 1380 retrieves, for each account, the corresponding consumption data collected with respect to different devices and different platforms where the users in the account accessed and consumed content. Based on the retrieved consumption data for each account, the data set generating unit 1380 creates a data-set 330 for the account. FIG. 13B illustrates exemplary types of information included in the data set for an account, in accordance with various embodiments of the present teaching. For instance, each data set includes information pertaining to the content consumed, a usage time corresponding to an amount of time spent by the user consuming the content, a device type corresponding to the type of device used by the user to consume the content, an account ID i.e., a user ID, household ID, social group ID etc., an IP address of the device, attributes related to the content e.g., cookie, an operating system (OS), web-browser type installed on the device, a number of exposure opportunities presented to the user, a number of conversions (e.g., clicks performed by the user) and other information.

The data sets corresponding to different accounts are input to the profile engine 1390 of the account profiling unit 320. By one embodiment, the profile engine 1390 creates persistent account profiles 340. Each persistent account profile includes the data set corresponding to the account and a persistent identifier for the account (i.e., the universal ID for a user level account, or a universal identifier for a household account, social group account, etc.). Thus, the universal identifier represents consumption data relevant to the users of the account as well the devices used by the users to consume content on different platforms, different applications, etc. Moreover, by one embodiment, the account profiling unit 320 compute, a usefulness value of a particular data set with respect to all data sets. The usefulness value can be computed based on characteristics of the data set including an amount of content consumption, a time of data consumption, type of device, and other parameters.

Thus, as shown in FIG. 3A, the persistent account profiles 340 and the data sets 330, can be transmitted to the single source panel unit 370. In this manner, an advertiser system 108, and/or a publisher system 106 may access the single source panel unit 370 to select specific accounts that are to be targeted based on source constraints (i.e., constraints related to the publisher system) and/or demand constraints (i.e., constraints related to the advertiser system). As described next with reference to FIG. 15, the single source panel unit 370 may be configured to retrieve and display, a requested persistent account profile.

Figure 14:
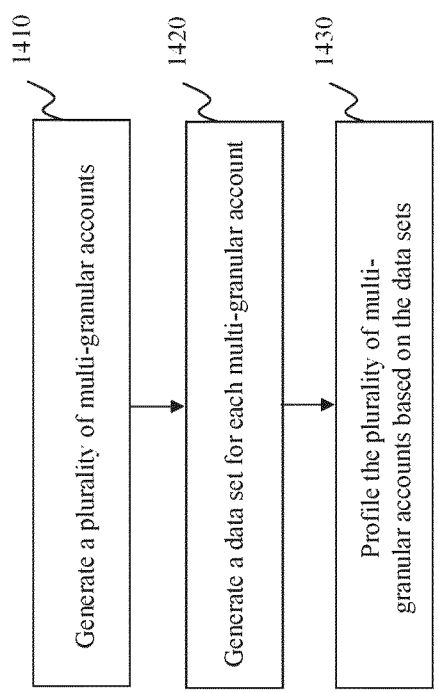
FIG. 14 is a flowchart of an exemplary process of the account profiling unit, in accordance with various embodiments of the present teaching.

FIG. 14 is a flowchart of an exemplary process of the account profiling unit, in accordance with various embodiments of the present teaching. The process commences in step 1410, wherein the account profiling unit generates multi-granular accounts e.g., individual user accounts, household accounts, and social group accounts, based on information provided by third party services. In step 1420, the process generates a data set corresponding to each multi-granular account. That is, for each granular account, consumption data related to the account is collected. Such collection can be performed based on the account information, which includes at least the associated list of devices, identifiers, platforms, etc., such that the consumption data can be gathered across devices, platforms, etc. Note that when the granular account is at a coarser level, the account includes multiple individual users and devices, and the consumption data for the account can be performed across all of its member users and devices. In step 1430, the multi-granular accounts are profiled based on the collected information (i.e., consumption information) for the account.

Figure 15:
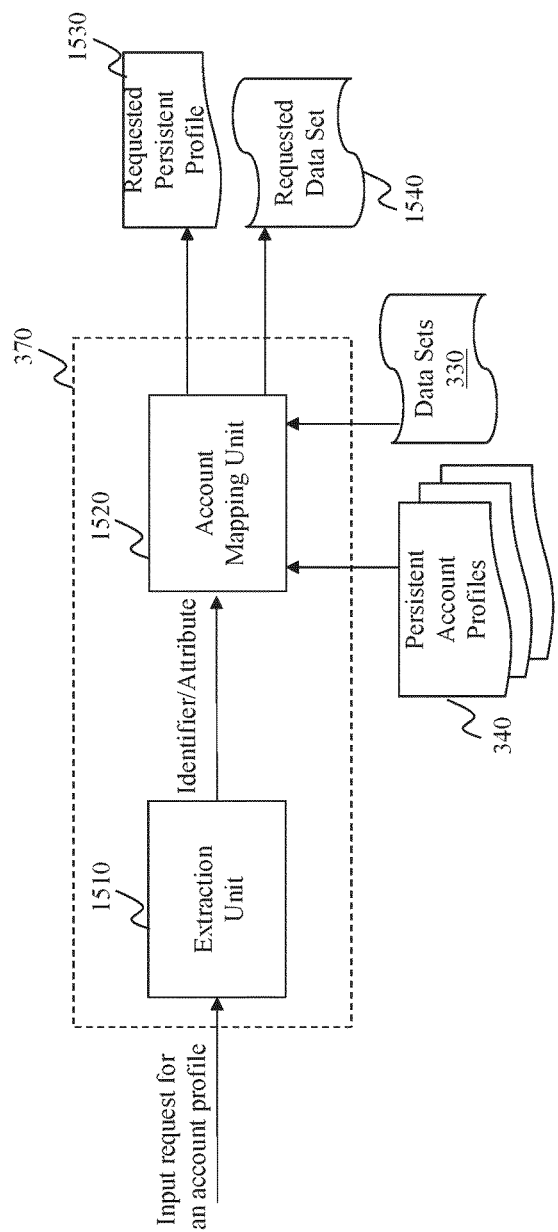
FIG. 15 depicts an exemplary block diagram of a single source panel unit, in accordance with various embodiments of the present teaching.

FIG. 15 depicts an exemplary block diagram of a single source panel unit, in accordance with various embodiments of the present teaching. The single source panel unit 370 includes an extraction unit 1510 and an account mapping unit 1520. A request to retrieve a particular account profile i.e., the persistent account profile is received by the single source panel unit 370. Such a request may be transmitted, for instance, by an advertiser and/or publisher system. Upon receiving the request, the extraction unit 1510 extracts at least one identifier and/or attribute from the request. The extracted identifier or attribute is used by the account mapping unit 1520 to search for the requested account profile from the set of persistent account profiles. Upon retrieving the requested persistent account profile 1530, the single source panel unit 370 may transmit and/or display (e.g., on a display panel associated with the advertiser and/or publisher), the requested persistent account profile 1530 and/or the data set 330 associated with the requested persistent account 1540.

Figure 16:
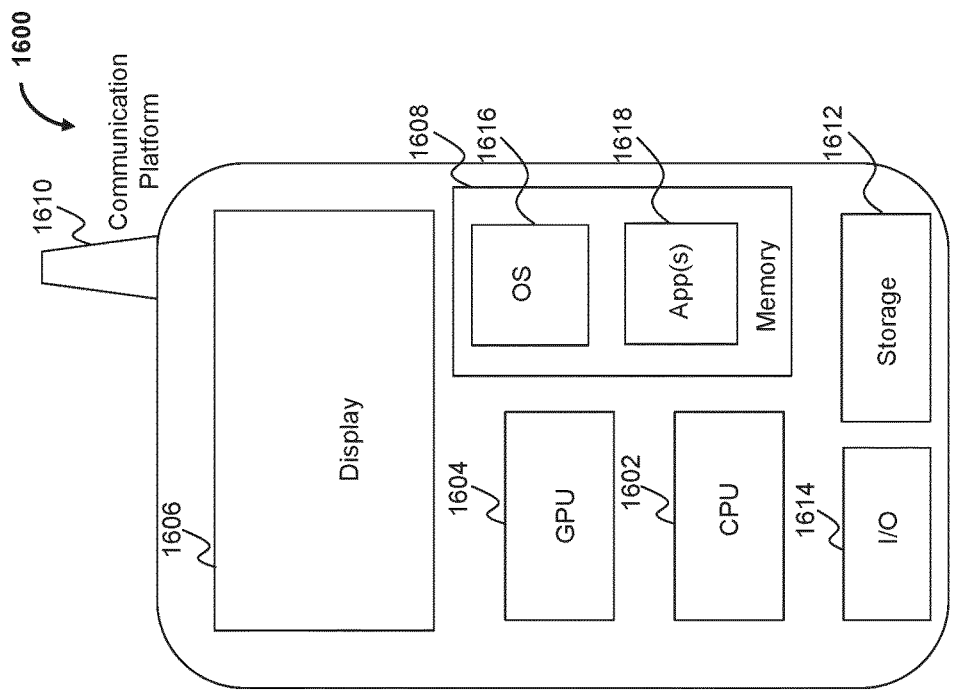
FIG. 16 depicts an architecture of a mobile device which can be used to implement a specialized system incorporating the present teaching.

FIG. 16 depicts the architecture of a mobile device that can be used to realize the present teaching as a specialized system. In this example, the user device on which an advertisement is presented is a mobile device 1600, such as but not limited to, a smart phone, a tablet, a music player, a handled gaming console, or a global positioning system (GPS) receiver. The mobile device 1600 in this example includes one or more central processing units (CPUs) 1602, one or more graphic processing units (GPUs) 1604, a display 1606, a memory 1608, a communication platform 1610 (such as a wireless communication module), storage 1612, and one or more input/output (I/O) devices 1614. Any other suitable component, such as but not limited to a system bus or a controller (not shown), may also be included in the mobile device 1600.

As shown in FIG. 16, a mobile operating system 1616, e.g., iOS, Android, Windows Phone, etc., and one or more applications 1618 may be loaded into the memory 1608 from the storage 1612 in order to be executed by the CPU 1602. The applications 1618 may include a browser or other application that enables a user to access content (e.g., advertisements or other content), provides presentations of content to users, monitors user activities related to presented content (e.g., whether a user has viewed an advertisement, whether the user interacted with the advertisement in other ways, etc.), reports events (e.g., throttle events), or performs other operations.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 17:
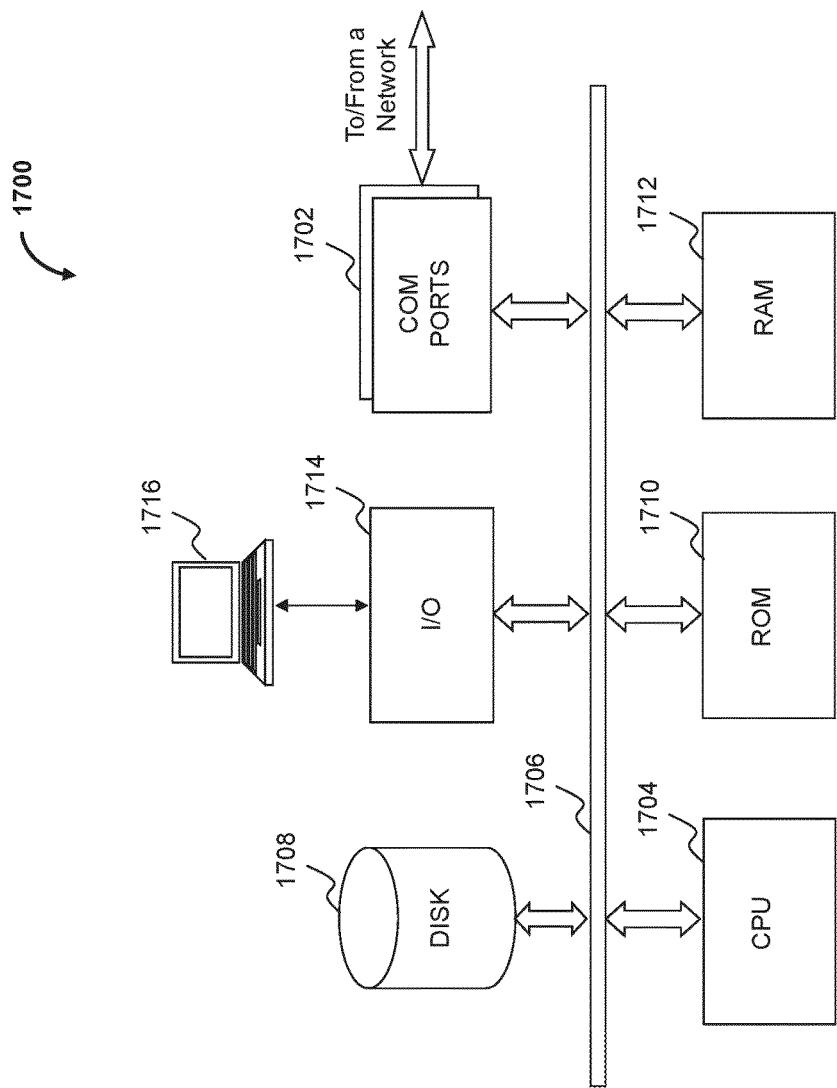
FIG. 17 depicts the architecture of a computer which can be used to implement a specialized system incorporating the present teaching.

FIG. 17 depicts an architecture of a computer based on which the present teaching can be realized as a specialized system for facilitating content item serving. The computer may be a general-purpose computer or a special purpose computer. This computer 1700 can be used to implement the functions of any components of the ad-serving system as described herein. Different components of the system in the present teaching can all be implemented on one or more computers such as computer 1700, via its hardware, software program, firmware, or a combination thereof. Although only one such computer is shown, for convenience, the computer functions relating to for instance, the segmentation unit, the estimation unit, and the allocation unit may be implemented in a distributed fashion on a number of similar platforms, to distribute the processing load.

The computer 1700, for example, includes COM ports 1702 connected to and from a network connected thereto to facilitate data communications. The computer 1700 also includes a central processing unit (CPU) 1704, in the form of one or more processors, for executing program instructions. The exemplary computer platform includes an internal communication bus 1706, program storage and data storage of different forms, e.g., disk 1708, read only memory (ROM) 1710, or random access memory (RAM) 1712, for various data files to be processed and/or communicated by the computer, as well as possibly program instructions to be executed by the CPU. The computer 1700 also includes an I/O component 1714, supporting input/output flows between the computer and other components therein such as user interface elements 1716. The computer 1700 may also receive programming and data via network communications.

Hence, aspects of the methods described herein may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution. In addition, the components of the system as disclosed herein can be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a computer having at least one processor, a storage, and a communication platform for profiling accounts, the method comprising:
   obtaining a plurality of identifiers from one or more third party servers, wherein the plurality of identifiers include at least a cookie and an Internet Protocol (IP) address, wherein each of the plurality of identifiers is associated with one of a user device operated by a user and with at least one network data exchange platform on which the user requests content to be displayed on the user device in one or more media types;
   creating a plurality of accounts, via an account generator, each account corresponding to one or more users, and is associated with one or more identifiers associated with the respective one or more users, such that each account represents the respective one or more users across one or more user devices, the at least one network data exchange platform, and the one or more media types;
   generating a persistent identifier for each account, wherein the persistent identifier for each account links the plurality of identifiers associated with one or more respective users corresponding to the account;
   obtaining consumption data from the at least one network data exchange platform, wherein the consumption data characterizes content requested on one or more user devices associated with one or more respective users of the plurality of accounts;
   generating a persistent account profile for each account, wherein each persistent account profile includes the persistent identifier and the consumption data associated with the account;
   receiving supply information from a publisher server, the supply information identifying an advertisement exposure opportunity and associated supply constraints;
   generating sets of ordered audience clusters for the advertisement exposure opportunity by:
      filtering the plurality of persistent account profiles based on criteria provided with the supply constraints, the criteria including requirements corresponding to at least a threshold achievable volume,
      generating audience clusters using the plurality of filtered persistent account profiles, wherein each audience cluster comprises a grouping of one or more of the plurality of filtered persistent account profiles that share a common characteristic, and
      ordering the audience clusters based on expected performance metrics corresponding to the audience clusters, wherein the expected performance metrics are derived from previous content access from the one or more third party servers, wherein the expected performance metrics include at least one of: expected viewability and expected click-through-rate (CTR), wherein a first set of ordered audience clusters is ordered based on expected viewability and a second set of ordered audience clusters is ordered based on expected CTR;
   selecting the first set of ordered audience clusters or the second set of ordered audience clusters as a selected set of ordered audience clusters based on desired performance metrics provided with demand constraints from an advertiser server;
   allocating the advertisement exposure opportunity to at least one audience cluster in the selected set of ordered audience clusters;
   delivering an advertisement corresponding to the advertisement exposure opportunity at a selected user device corresponding to a selected persistent account profile of the at least one audience cluster and displaying the advertisement on the selected user device;
   receiving feedback information related to the delivering of the advertisement, wherein the feedback information includes an action taken at the selected user device in response to the displayed advertisement; and updating the selected persistent account profile based on the feedback information.

2. The method of claim 1, wherein each persistent account profile is associated with one of a plurality of granularity-levels.

3. The method of claim 2, wherein the plurality of granularity-levels includes an individual level, a household level, a social group level, and an entity level.

4. The method of claim 3, wherein each persistent account profile associated with the household level includes at least one other user, and other user devices operated by the at least one other user to consume content across different platforms and media types.

5. The method of claim 1, wherein the persistent account profiles are generated based on at least one attribute associated with the consumption data.

6. The method of claim 5, wherein the at least one attribute corresponds to an amount of data consumed, and a time of data consumption.

7. The method of claim 1, wherein the one or more media types include at least text, audio, video, image, multi-media content, television, and/or any combination thereof.

8. A non-transitory machine-readable medium storing one or more programs configured for execution by a computer, the one or more programs comprising instructions for:
 obtaining a plurality of identifiers from one or more third party servers, wherein the plurality of identifiers include at least a cookie and an Internet Protocol (IP) address, wherein each of the plurality of identifiers is associated with one of a user device operated by a user and with at least one network data exchange platform on which the user requests content to be displayed on the user device in one or more media types;
 creating a plurality of accounts, via an account generator, each account corresponding to one or more users, and is associated with one or more identifiers associated with the respective one or more users, such that each account represents the respective one or more users across one or more user devices, the at least one network data exchange platform, and the one or more media types;
 generating a persistent identifier for each account, wherein the persistent identifier for each account links the plurality of identifiers associated with one or more respective users corresponding to the account;
 obtaining consumption data from the at least one network data exchange platform, wherein the consumption data characterizes content requested on one or more user devices associated with one or more respective users of the plurality of accounts;
 generating a persistent account profile for each account, wherein each persistent account profile includes the persistent identifier and the consumption data associated with the account;
 receiving supply information from a publisher server, the supply information identifying an advertisement exposure opportunity and associated supply constraints;
 generating sets of ordered audience clusters for the advertisement exposure opportunity by:
  filtering the plurality of persistent account profiles based on criteria provided with the supply constraints, the criteria including requirements corresponding to at least a threshold achievable volume,
  generating audience clusters using the plurality of filtered persistent account profiles, wherein each audience cluster comprises a grouping of one or more of the plurality of filtered persistent account profiles that share a common characteristic, and
  ordering the audience clusters based on expected performance metrics corresponding to the audience clusters, wherein the expected performance metrics are derived from previous content access from the one or more third party servers, wherein the expected performance metrics include at least one of: expected viewability and expected click-through-rate (CTR), wherein a first set of ordered audience clusters is ordered based on expected viewability and a second set of ordered audience clusters is ordered based on expected CTR;
 selecting the first set of ordered audience clusters or the second set of ordered audience clusters as a selected set of ordered audience clusters based on desired performance metrics provided with demand constraints from an advertiser server;
 allocating the advertisement exposure opportunity to at least one audience cluster in the selected set of ordered audience clusters;
 delivering an advertisement corresponding to the advertisement exposure opportunity at a selected user device corresponding to a selected persistent account profile of the at least one audience cluster and displaying the advertisement on the selected user device;
 receiving feedback information related to the delivering of the advertisement, wherein the feedback information includes an action taken at the selected user device in response to the displayed advertisement; and
 updating the selected persistent account profile based on the feedback information.

9. The non-transitory machine-readable medium of claim 8, wherein each persistent account profile is associated with one of a plurality of granularity-levels.

10. The non-transitory machine-readable medium of claim 9, wherein the plurality of granularity-levels includes an individual level, a household level, a social group level, and an entity level.

11. The non-transitory machine-readable medium of claim 10, wherein each persistent account profile associated with the household level includes at least one other user, and other user devices operated by the at least one other user to consume content across different platforms and media types.

12. The non-transitory machine-readable medium of claim 8, wherein the persistent account profiles are generated based on at least one attribute associated with the consumption data.

13. The non-transitory machine-readable medium of claim 12, wherein the at least one attribute corresponds to an amount of data consumed, and a time of data consumption.

14. The non-transitory machine-readable medium of claim 8, wherein the one or more media types include at least text, audio, video, image, multi-media content, television, and/or any combination thereof.

15. A system for profiling accounts, the system comprising a processor, memory, and one or more programs comprising instructions for:
 obtaining a plurality of identifiers from one or more third party servers, wherein the plurality of identifiers include at least a cookie and an Internet Protocol (IP) address, wherein each of the plurality of identifiers is associated with one of a user device operated by a user and with at least one network data exchange platform on which the user requests content to be displayed on the user device in one or more media types;

creating a plurality of accounts, via an account generator, each account corresponding to one or more users, and is associated with one or more identifiers associated with the respective one or more users, such that each account represents the respective one or more users across one or more user devices, the at least one network data exchange platform, and the one or more media types;

generating a persistent identifier for each account, wherein the persistent identifier for each account links the plurality of identifiers associated with one or more respective users corresponding to the account;

obtaining consumption data from the at least one network data exchange platform, wherein the consumption data characterizes content requested on one or more user devices associated with one or more respective users of the plurality of accounts;

generating a persistent account profile for each account, wherein each persistent account profile includes the persistent identifier and the consumption data associated with the account;

receiving supply information from a publisher server, the supply information identifying an advertisement exposure opportunity and associated supply constraints;

generating sets of ordered audience clusters for the advertisement exposure opportunity by:
  filtering the plurality of persistent account profiles based on criteria provided with the supply constraints, the criteria including requirements corresponding to at least a threshold achievable volume,
  generating audience clusters using the plurality of filtered persistent account profiles, wherein each audience cluster comprises a grouping of one or more of the plurality of filtered persistent account profiles that share a common characteristic, and
  ordering the audience clusters based on expected performance metrics corresponding to the audience clusters, wherein the expected performance metrics are derived from previous content access from the one or more third party servers, wherein the expected performance metrics include at least one of: expected viewability and expected click-through-rate (CTR), wherein a first set of ordered audience clusters is ordered based on expected viewability and a second set of ordered audience clusters is ordered based on expected CTR;

selecting the first set of ordered audience clusters or the second set of ordered audience clusters as a selected set of ordered audience clusters based on desired performance metrics provided with demand constraints from an advertiser server;

allocating the advertisement exposure opportunity to at least one audience cluster in the selected set of ordered audience clusters;

delivering an advertisement corresponding to the advertisement exposure opportunity at a selected user device corresponding to a selected persistent account profile of the at least one audience cluster and displaying the advertisement on the selected user device;

receiving feedback information related to the delivering of the advertisement, wherein the feedback information includes an action taken at the selected user device in response to the displayed advertisement; and updating the selected persistent account profile based on the feedback information.

16. The system of claim 15, wherein each persistent account profile is associated with one of a plurality of granularity-levels.

17. The system of claim 16, wherein the plurality of granularity-levels includes an individual level, a household level, a social group level, and an entity level.

18. The system of claim 17, wherein each persistent account profile associated with the household level includes at least one other user, and other user devices operated by the at least one other user to consume content across different platforms and media types.

* * * * *